US012118647B2

(12) United States Patent
Ungureanu et al.

(10) Patent No.: US 12,118,647 B2
(45) Date of Patent: Oct. 15, 2024

(54) GENERATING COLORIZED DIGITAL IMAGES UTILIZING A RE-COLORIZATION NEURAL NETWORK WITH LOCAL HINTS

(71) Applicant: Adobe Inc., San Jose, CA (US)

(72) Inventors: Adrian-Stefan Ungureanu, Bucharest (RO); Ionut Mironica, Bucharest (RO); Richard Zhang, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 360 days.

(21) Appl. No.: 17/405,207

(22) Filed: Aug. 18, 2021

(65) Prior Publication Data

US 2023/0055204 A1 Feb. 23, 2023

(51) Int. Cl.
*G06T 11/00* (2006.01)
*G06N 3/04* (2023.01)

(52) U.S. Cl.
CPC .............. *G06T 11/001* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 2020/0302656 | A1* | 9/2020 | Kumar | G06F 3/04845 |
| 2021/0233287 | A1* | 7/2021 | Kumar | G06T 7/90 |
| 2023/0059407 | A1* | 2/2023 | Toizumi | G06V 10/761 |

FOREIGN PATENT DOCUMENTS

WO    WO-2022086554 A1 *  4/2022

OTHER PUBLICATIONS

Iizuka, Satoshi, Edgar Simo-Serra, and Hiroshi Ishikawa. "Let there be color! Joint end-to-end learning of global and local image priors for automatic image colorization with simultaneous classification." ACM Transactions on Graphics (ToG) 35, No. 4 (2016): 1-11.
Vitoria, Patricia, Lara Raad, and Coloma Ballester. "ChromaGAN: adversarial picture colorization with semantic class distribution." In Proceedings of the IEEE/CVF Winter Conference on Applications of Computer Vision, pp. 2445-2454. 2020.
Zhang, Richard, Phillip Isola, and Alexei A. Efros. "Colorful image colorization." In European conference on computer vision, pp. 649-666. Springer, Cham, 2016.

(Continued)

*Primary Examiner* — Aaron M Richer
(74) *Attorney, Agent, or Firm* — Keller Preece PLLC

(57) ABSTRACT

This disclosure describes methods, non-transitory computer readable storage media, and systems that utilize one or more stages of a two-stage image colorization neural network to colorize or re-colorize digital images. In one or more embodiments, the disclosed system generates a color digital image from a grayscale digital image by utilizing a colorization neural network. Additionally, the disclosed system receives one or more inputs indicating local hints comprising one or more color selections to apply to one or more objects of the color digital image. The disclosed system then utilizes a re-colorization neural network to generate a modified digital image from the color digital image by modifying one or more colors of the object(s) based on the luminance channel, color channels, and selected color(s).

20 Claims, 17 Drawing Sheets

(56) References Cited

OTHER PUBLICATIONS

Su, Jheng-Wei, Hung-Kuo Chu, and Jia-Bin Huang. "Instance-aware image colorization." In Proceedings of the IEEE/CVF Conference on Computer Vision and Pattern Recognition, pp. 7968-7977. 2020.

Kumar, Manoj, Dirk Weissenborn, and Nal Kalchbrenner. "Colorization transformer." arXiv preprint arXiv:2102.04432 (2021).

Antic Jason. "Deoldify". URL: "https://github.com/jantic/DeOldify", accessed on Apr. 12, 2021.

Zhang, Richard, Jun-Yan Zhu, Phillip Isola, Xinyang Geng, Angela S. Lin, Tianhe Yu, and Alexei A. Efros. "Real-time user-guided image colorization with learned deep priors." arXiv preprint arXiv:1705.02999 (2017).

Xiao, Yi, Peiyao Zhou, and Yan Zheng. "Interactive deep colorization with simultaneous global and local inputs." arXiv preprint arXiv:1801.09083 (2018).

Ci, Yuanzheng, Xinzhu Ma, Zhihui Wang, Haojie Li, and Zhongxuan Luo. "User-guided deep anime line art colorization with conditional adversarial networks." In Proceedings of the 26th ACM international conference on Multimedia, pp. 1536-1544. 2018.

Saito, Masaki, and Yusuke Matsui. "Illustration2vec: a semantic vector representation of illustrations." In SIGGRAPH Asia 2015 Technical Briefs, pp. 1-4. 2015.

Simonyan, Karen, and Andrew Zisserman. "Very deep convolutional networks for large-scale image recognition." arXiv preprint arXiv:1409.1556 (2014).

Zhang, Lvmin, Chengze Li, Tien-Tsin Wong, Yi Ji, and Chunping Liu. "Two-stage sketch colorization." ACM Transactions on Graphics (TOG) 37, No. 6 (2018): 1-14; part 1.

Zhang, Lvmin, Chengze Li, Tien-Tsin Wong, Yi Ji, and Chunping Liu. "Two-stage sketch colorization." ACM Transactions on Graphics (TOG) 37, No. 6 (2018): 1-14; part 2.

URL: https://github.com/sovrasov/flops-counter.pytorch, accessed on Apr. 12, 2021.

Chang, Huiwen, Ohad Fried, Yiming Liu, Stephen DiVerdi, and Adam Finkelstein. "Palette-based photo recoloring." ACM Trans. Graph. 34, No. 4 (2015): 139-1; part 1.

Chang, Huiwen, Ohad Fried, Yiming Liu, Stephen DiVerdi, and Adam Finkelstein. "Palette-based photo recoloring." ACM Trans. Graph. 34, No. 4 (2015): 139-1; part 2.

Zhao, Nanxuan, Quanlong Zheng, Jing Liao, Ying Cao, Hanspeter Pfister, and Rynson WH Lau. "Selective Region-based Photo Color Adjustment for Graphic Designs." ACM Transactions on Graphics (TOG) 40, No. 2 (2021): 1-16.

Wu, Yuxin, Kirillov Alexander, Massa Francisco, Lo Wan-Yen and Ross Girshick. "Detectron2". URL: "https://github.com/facebookresearch/detectron2" accessed on Apr. 12, 2021.

Johnson, Justin, Alexandre Alahi, and Li Fei-Fei. "Perceptual losses for real-time style transfer and super-resolution." In European conference on computer vision, pp. 694-711. Springer, Cham, 2016.

Gulrajani, Ishaan, Faruk Ahmed, Martin Arjovsky, Vincent Dumoulin, and Aaron Courville. "Improved training of wasserstein gans." arXiv preprint arXiv:1704.00028 (2017).

Isola, Phillip, Jun-Yan Zhu, Tinghui Zhou, and Alexei A. Efros. "Image-to-image translation with conditional adversarial networks." In Proceedings of the IEEE conference on computer vision and pattern recognition, pp. 1125-1134. 2017.

Deng, Jia, Wei Dong, Richard Socher, Li-Jia Li, Kai Li, and Li Fei-Fei. "Imagenet: A large-scale hierarchical image database." In 2009 IEEE conference on computer vision and pattern recognition, pp. 248-255. Ieee, 2009.

Karras, Tero, Timo Aila, Samuli Laine, and Jaakko Lehtinen. "Progressive growing of gans for improved quality, stability, and variation." arXiv preprint arXiv:1710.10196 (2017); part 1.

Karras, Tero, Timo Aila, Samuli Laine, and Jaakko Lehtinen. "Progressive growing of gans for improved quality, stability, and variation." arXiv preprint arXiv:1710.10196 (2017); part 2.

He, Kaiming, Jian Sun, and Xiaoou Tang. "Guided image filtering." In European conference on computer vision, pp. 1-14. Springer, Berlin, Heidelberg, 2010.

Krizhevsky, Alex, Ilya Sutskever, and Geoffrey E. Hinton. "Imagenet classification with deep convolutional neural networks." Advances in neural information processing systems 25 (2012): 1097-1105.

Zhang, Richard, Phillip Isola, Alexei A. Efros, Eli Shechtman, and Oliver Wang. "The unreasonable effectiveness of deep features as a perceptual metric." In Proceedings of the IEEE conference on computer vision and pattern recognition, pp. 586-595. 2018.

\* cited by examiner

GENERATING COLORIZED DIGITAL IMAGES UTILIZING A RE-COLORIZATION NEURAL NETWORK WITH LOCAL HINTS

BACKGROUND

Advances in computer processing and machine learning have led to significant advancements in the field of digital image processing. Specifically, machine-learning models and neural networks provide many different types of systems the ability to intelligently modify of various aspects of digital images. For example, many systems utilize neural networks to detect content (e.g., objects) in digital images and then modify characteristics of the content in the digital images. According to various embodiments, modifying content of digital images using machine-learning includes automatically restoring and/or colorizing (or re-colorizing) degraded images or grayscale images (e.g., by automatically applying colors to old photographs). Because restoring and modifying images involves making predictions on missing information or damaged pixels, accurately interpreting the data in the images is an important and challenging aspect of machine-learning image modification. Despite these advancements, conventional image editing systems continue to experience a number of disadvantages with respect to accuracy, efficiency, and flexibility.

SUMMARY

This disclosure describes one or more embodiments of methods, non-transitory computer readable media, and systems that solve the foregoing problems (in addition to providing other benefits) by utilizing a re-colorization neural network to colorize digital images or re-colorize digital images based on local hints. Specifically, in one or more embodiments, the disclosed systems generate a color digital image from a grayscale digital image by utilizing a colorization neural network. Additionally, the disclosed systems receive one or more inputs indicating local hints comprising one or more color selections to apply to one or more objects of the color digital image. The disclosed systems then utilize a re-colorization neural network to generate a modified digital image from the color digital image by modifying one or more colors of the object(s) based on a luminance channel, color channels, and selected color(s). As described below, the disclosed systems provide improved accuracy and flexibility in image colorization and re-colorization.

BRIEF DESCRIPTION OF THE DRAWINGS

The detailed description refers to the drawings briefly described below.

DETAILED DESCRIPTION

Figure 1:
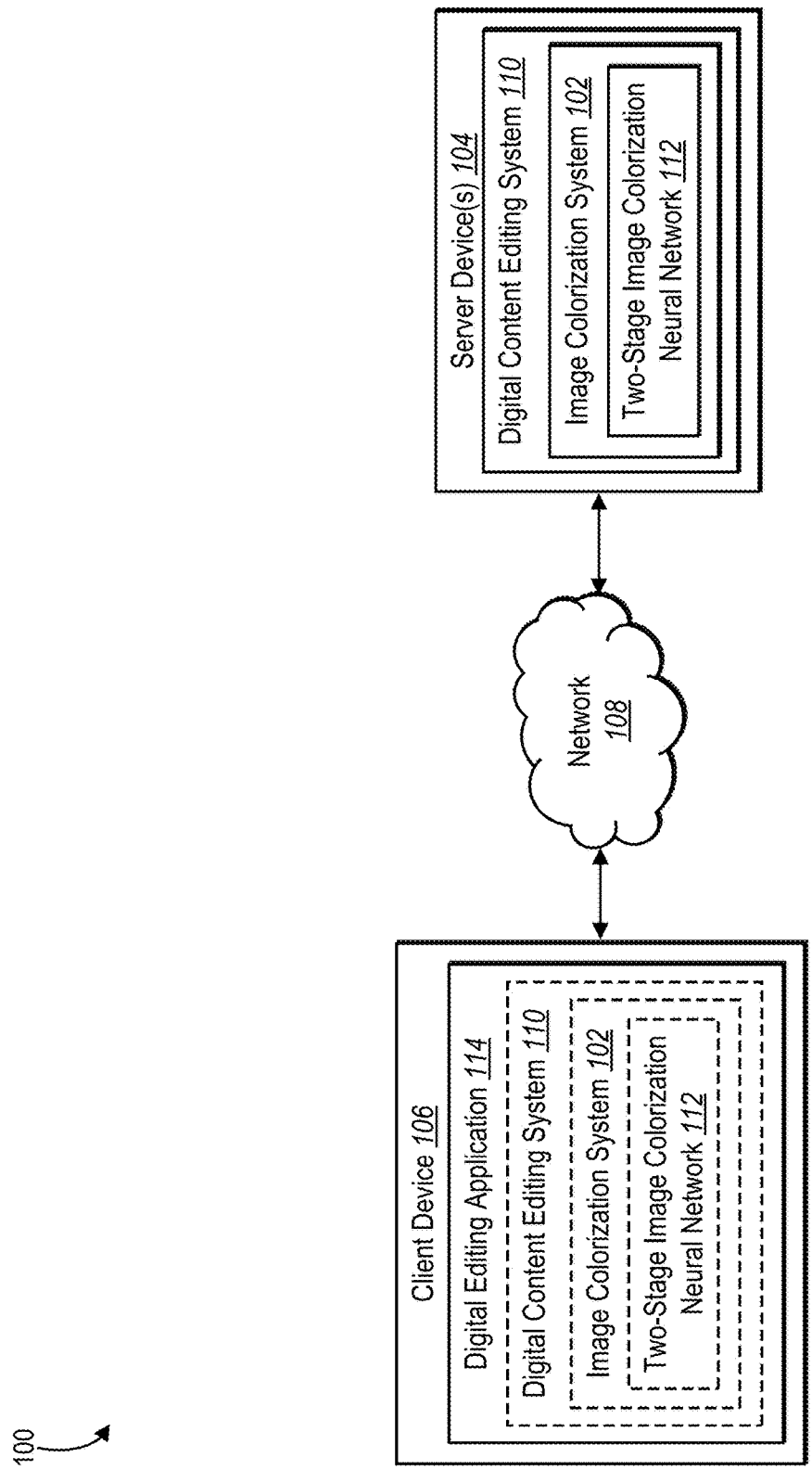
FIG. 1 illustrates a block diagram of a system environment in which an image colorization system is implemented in accordance with one or more implementations.

This disclosure describes one or more embodiments of an image colorization system comprising a two-stage image colorization neural network with flexibility that allows for automatic (e.g., without user input or instructions) image colorization, interactive image re-colorization, and interactive image re-colorization. To illustrate, the image colorization system utilizes one or more neural networks to automatically restore (e.g., by colorizing) old (e.g., "legacy") photographs and/or re-colorize specific portions of old photographs. For example, the image colorization system utilizes a colorization neural network to generate a colorized digital image based on a luminance channel of a grayscale digital image such as a legacy photograph. Additionally, the image colorization system receives one or more inputs comprising local hints with selected colors to apply to one or more objects in the colorized digital image. The image colorization system then utilizes a re-colorization neural network to generate a modified digital color image based on the luminance channel, color channels of the colorized digital image, and the local hints of the user inputs. By colorizing digital images utilizing a re-colorization neural network and based on local hints, the image colorization system provides improved color replacement (or other image colorization) with improved accuracy and flexibility.

As mentioned, in one or more embodiments, the image colorization system utilizes luminance and/or color data to colorize or re-colorize digital images. Specifically, according to one or more embodiments, the image colorization system determines a luminance channel from a grayscale digital image (or a digital image limited to a small number of color values such as sepia images). For instance, the image colorization system utilizes a colorization neural network to automatically generate a colorized digital image based on the luminance channel of the grayscale image. To illustrate, the image colorization system utilizes the image colorization neural network to generate the colorized digital image including predicted color pixel values (e.g., predicted color channels) for pixels in the grayscale digital image. In additional embodiments, the image colorization system determines a luminance channel and color channels from a color digital image.

In one or more embodiments, the image colorization system receives user inputs indicating local hints for modifying colors in a color digital image. In particular, the image colorization system determines selected locations from the one or more user inputs corresponding to one or more regions of the color digital image. For example, a user input indicates a local hint corresponding to one or more pixels at a particular location within a digital image. The image colorization system determines an object of the digital image based on the location of the local hint within the digital image. Additionally, the image colorization system determines a selected color corresponding to the user input for modifying one or more colors in the object corresponding to the location of the local hint.

According to one or more additional embodiments, the image colorization system generates a modified digital image from a color digital image by utilizing a re-colorization neural network to replace colors in the color digital image. To illustrate, in embodiments in which the image colorization system generates a modified digital image from a grayscale digital image, the image colorization system utilizes a re-colorization neural network to replace colors in a colorized digital image generated utilizing a colorization neural network. Specifically, the image colorization system utilizes a luminance channel from the grayscale digital image and color channels from the output of the image colorization neural network to generate the modified digital image. Additionally, the image colorization system utilizes the image re-colorization neural network to generate the modified digital image by modifying one or more objects of the colorized digital image according to the locations of the local hints and selected colors based on user inputs.

In alternative embodiments, the image colorization system utilizes a re-colorization neural network to generate a modified digital image by replacing colors in an existing color digital image. In particular, the image colorization system extracts a luminance channel and color channels from the color digital image. The image colorization system then utilizes the image re-colorization neural network to generate the modified digital image based on the luminance channel and color channels extracted from the color digital image according to the locations of the local hints and selected colors based on user inputs.

In additional embodiments, the image colorization system utilizes a re-colorization neural network to augment a dataset of digital images. For example, the image colorization system generates an automatically colorized digital image from a ground truth digital image utilizing a colorization neural network. The image colorization system also samples a plurality of local hints from the ground truth digital image. Based on the sampled local hints, the image colorization system generates a blended digital image that includes colors from regions in the ground truth digital image and colors from other regions in the automatically colorized digital image. In some embodiments, the image colorization system utilizes the augmented digital image to further update parameters of the image re-colorization neural network to learn to accurately conserve colors of regions of digital images not containing local hints.

In one or more embodiments, the image colorization system further trains a re-colorization neural network based on a loss corresponding to local hints from user inputs. Specifically, the image colorization system generates a mask for each local hint of a plurality of local hints based on a thresholded difference between a colorized digital image and a modified portion (e.g., prediction by the image re-colorization neural network) for the local hint. Additionally, the image colorization system utilizes the mask to determine a local hints region loss based on the modified portion for the local hint, a color value associated with the local hint, and the mask. Accordingly, the image colorization system utilizes a plurality of local hints region losses to update the parameters of the image re-colorization neural network. In some embodiments, the image colorization system combines the local hints region loss with additional losses associated with the image re-colorization neural network to update parameters of the image re-colorization neural network.

Conventional image colorization systems have a number of shortcomings in relation to accuracy and flexibility of operation. For example, many existing image colorization systems perform colorization of digital images utilizing neural networks that inflexibly colorize digital images. While such systems can provide quality colorization of non-colorized images, these systems rigidly determine the colorization for specific regions. In particular, many of these conventional image editing systems provide users with no control over the colorization output of the neural networks. Additionally, while some of these existing systems provide limited colorization variance options to users, the conventional systems only provide global colorization options with little-to-no control over local customization.

Other existing image editing systems provide interactive colorization by sampling locations of a digital image with a geometric distribution around the center of the image. Additionally, these conventional systems determine global hints based on color distributions/histograms. While such conventional systems attempt to overcome the flexibility limitations of systems that provide only automatic and rigid colorization, these systems are often inefficient and inaccurate.

Furthermore, such conventional systems often require significant amounts of processing time, resulting in significant amounts of computing resources such as processing power and memory to process each digital image. Furthermore, the conventional image editing systems typically cycle through several segmentation masks to present to a user the likeliest object in an image for re-colorization, which causes unnecessary resource usage to generate segmentation masks that are not used.

Additionally, conventional image editing systems often inaccurately provide re-colorization of digital images. Specifically, the previously indicated conventional systems that provide no user control or limited user control over image colorization also provide limited user control over the output of the conventional neural networks. Thus, when a segmentation step of the conventional systems fails, the resulting output can include color bleeding across boundaries of objects or ignoring objects entirely in a digital image. Furthermore, incorrect segmentation or inaccurate classifications of objects also results in unnatural colorization of certain objects (e.g., incorrect labeling of objects) or noise in the predicted colors.

The disclosed image colorization system provides a number of benefits over conventional systems. For example, the image colorization system improves the flexibility of computing systems that modify digital images. In contrast to existing systems that rigidly colorize digital images, the image colorization system provides a significant amount of user control over re-colorization of digital images. In particular, the image colorization system utilizes a multi-stage process with a plurality of neural networks for colorizing and re-colorizing digital images. Furthermore, the image colorization system utilizes a re-colorization neural network that re-colorizes digital images based on local hints indicating colors for re-colorizing specific portions of the digital images. The image colorization system thus generates an intermediate prediction with automatic colorization via a first stage and then differentiates between regions for re-colorization based on local hints and regions maintaining the automatic colorization via a second stage. Re-colorizing based on local hints in a single processing provides greater control over the output of a re-colorization neural network by allowing for small corrections across a plurality of objects with different colors.

The image colorization system also improves the accuracy of computing systems that colorize digital images. Specifically, in contrast to conventional systems that often re-colorize digital images resulting in color bleeding or incorrect color predictions, the image colorization system provides accurate re-colorizations of specific object instances based on user input. For instance, by utilizing neural networks with residual blocks, the image colorization system limits the global impact of each local hint (e.g., the impact of a local input on other objects). To illustrate, the image colorization system learns parameters of the residual blocks based on augmented ground truth digital images and a local hints region loss to accurately apply re-colorization to specific instances of objects based on local hints without causing inaccuracies in other objects. This results in colorizing and re-colorizing portions of digital images with natural colors of objects that are better integrated in the image's texture while minimizing or eliminating color bleeding across boundaries of objects. For example, the image colorization system provides accurate, natural colorization of skin tones in images with humans and faces.

Additionally, the image colorization system also provides more efficient re-colorization of digital images than conventional image editing systems. Specifically, the image colorization system utilizes re-colorization neural networks with architectures that utilize fewer operations than conventional systems. More specifically, the image colorization system utilizes colorization and re-colorization neural networks with residual blocks that provide faster inference time for generating color value predictions for pixels in a digital image, which results in faster processing than the conventional image editing systems.

Turning now to the figures, FIG. 1 includes an embodiment of a system environment 100 in which an image colorization system 102 operates. In particular, the system environment 100 includes server device(s) 104 and a client device 106 in communication via a network 108. Moreover, as shown, the server device(s) 104 include a digital content editing system 110, which includes the image colorization system 102. Furthermore, FIG. 1 illustrates that the image colorization system 102 includes a two-stage image colorization neural network 112. Additionally, the client device 106 includes a digital editing application 114, which optionally includes the digital content editing system 110, the image colorization system 102, and the two-stage image colorization neural network 112.

As shown in FIG. 1, the server device(s) 104 includes or hosts the digital content editing system 110. Specifically, the digital content editing system 110 includes, or is part of, one or more systems that implement digital image processing. For example, the digital content editing system 110 provides tools for viewing, generating, editing, and/or otherwise interacting with digital images (e.g., via the digital editing application 114 of the client device 106). In one or more embodiments, the digital content editing system 110 processes digital content items including digital images and/or digital videos. To illustrate, the digital content editing system 110 provides tools for editing digital photographs such as via image retouching, denoising, colorizing/re-colorizing, or applying other filters to the digital images. In some embodiments, the digital content editing system 110 receives one or more requests from the client device 106 to perform one or more operations on a digital image (e.g., stored at the server device(s) 104). In one or more additional embodiments, the digital content editing system 110 processes digital images in connection with one or more additional systems such as cloud-storage systems.

In connection with generating or modifying digital images, the digital content editing system 110 includes the image colorization system 102 to perform colorization operations on digital images. In particular, the image colorization system 102 utilizes the two-stage image colorization neural network 112 to modify colors of objects in digital images. For example, the image colorization system 102 receives user inputs interacting with portions of digital images via the client device 106 indicating local hints with selected colors for modifying the digital images. Additionally, the image colorization system 102 utilizes the two-stage image colorization neural network 112 to process the digital images based on the local hints received from the client device 106 and replace colors in the digital images with the selected colors.

In additional embodiments, the image colorization system 102 utilizes the two-stage image colorization neural network 112 to automatically colorize digital images and replace colors in the digital images. Specifically, the image colorization system 102 utilizes a first stage of the two-stage image colorization neural network 112 (e.g., a colorization neural network) to automatically generate a colorized digital image from a colorless digital image. The image colorization system 102 utilizes a second stage of the two-stage image colorization neural network 112 (e.g., a re-colorization neural network) to replace one or more colors in the colorized digital image based on local hints indicated by user inputs.

In one or more embodiments, a digital image includes a computer representation of visual content. For example, a digital image includes, but is not limited to, a digital photograph, a digital video frame, a computer-generated image, a drawn image, or a digitally scanned image. In some embodiments, a digital image includes one or more objects of a scene including various combinations of foreground objects and/or background objects.

In addition, a color digital image includes color information for each pixel with a plurality of values representing the color in a particular color space. To illustrate, a color image includes color values in an L*a*b color space with "L" representing a luminance channel and "ab" representing chrominance values of pixels in a digital image. Furthermore, a colorless digital image includes a digital image with pixel values without color values. For example, colorless or non-color digital image includes a black and white digital image or a grayscale digital image that includes only a luminance channel such that the pixels appear white, black, or various shades of gray. In some embodiments, a non-color digital image includes sepia tones or other limited set of color values for pixels. Thus, a colorized digital image includes a digital image with predicted color values for a grayscale digital image or non-color digital image (e.g., via a re-colorization neural network).

According to one or more embodiments, a neural network includes a computer representation that can be tuned (e.g., trained) based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a convolutional neural network, a recurrent neural network, a residual neural network, an adversarial neural network, and/or one or more layers including combinations of such. In one or more embodiments, a re-colorization neural network includes a neural network with one or more encoders or decoders including residual neural network layers to generate predictions of pixel values including color values. Accordingly, a two-stage image colorization neural network performs operations for colorizing and/or replacing colors of color pixels in digital images.

In one or more embodiments, a local hint includes an information indicated by a user input to set a color of a region in a digital image. For instance, a local hint includes a selected set of one or more pixels within a region corresponding to an object of the digital image. Additionally, in some embodiments, the image colorization system 102 receives local hints from the client device 106 based on a tool or user interface element that provides a visual indication of the location and/or selected color of a local hint at the client device 106.

Furthermore, in one or more embodiments, an object includes a visible item with a boundary relative to other visible items in a digital image. For example, an object includes an item in a foreground or a background of a digital image including, but not limited to, items such as furniture, people, faces, clothing, buildings, vehicles, or the like. Alternatively, objects include patterns or designs within a digital image. Additionally, in one or more embodiments, an object includes a portion of a larger object (i.e., a subcomponent of an object) such as a particular body part or a vehicle component. In some embodiments, a digital image includes a plurality of foreground objects or background objects presented according to a particular perspective such that one or more of the objects overlap one or more other objects in a scene.

In one or more embodiments, the server device(s) 104 include a variety of computing devices, including those described below with reference to FIG. 10. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, the client device 106 is operable by a user (e.g., a user included in, or associated with, the system environment 100) to perform a variety of functions. In particular, the client device 106 performs functions such as, but not limited to, accessing, generating, viewing, modifying, and otherwise interacting with digital images or datasets of digital images via the digital editing application 114. The client device 106 also performs functions for generating, capturing, or accessing data to provide to the digital content editing system 110 and the image colorization system 102 in connection with generating and modifying digital images. For example, the client device 106 communicates with the server device(s) 104 via the network 108 to provide digital images to the server device(s) 104 or receiving digital images from the server device(s) 104. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the image colorization system 102 communicate and/or interact via other methods (e.g., the server device(s) 104 and the client device 106 can communicate directly).

In particular, in some implementations, the image colorization system 102 on the server device(s) 104 supports the image colorization system 102 on the client device 106. For instance, the image colorization system 102 on the server device(s) 102 learns parameters for the two-stage image colorization neural network 112. The image colorization system 102 then, via the server device(s) 104, provides the two-stage image colorization neural network 112 to the client device 106. In other words, the client device 106 obtains (e.g., downloads) the two-stage image colorization neural network 112 with the learned parameters from the server device(s) 104. Once downloaded, the client device 106 can utilize the two-stage image colorization neural network 112 to perform one or more image colorization tasks independent from the server device(s) 104.

In alternative implementations, the image colorization system 102 on the server device(s) 104 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform a colorization task utilizing one or more stages of the two-stage image colorization neural network 112, and, in response, the image colorization system 102 on the server device(s) 104 performs the task. The server device(s) 104 then provides the output or results of the colorization task to the client device 106.

Thus, although FIG. 1 illustrates the image colorization system 102 being implemented by a particular component and/or device within the system environment 100, the image colorization system 102 can be implemented, in whole or in part, by other computing devices and/or components in the system environment 100 (e.g., the client device 106). Additionally, the server device(s) 104 and/or the client device 106 may access digital images from a third-party system via the network 108.

Figure 2A:
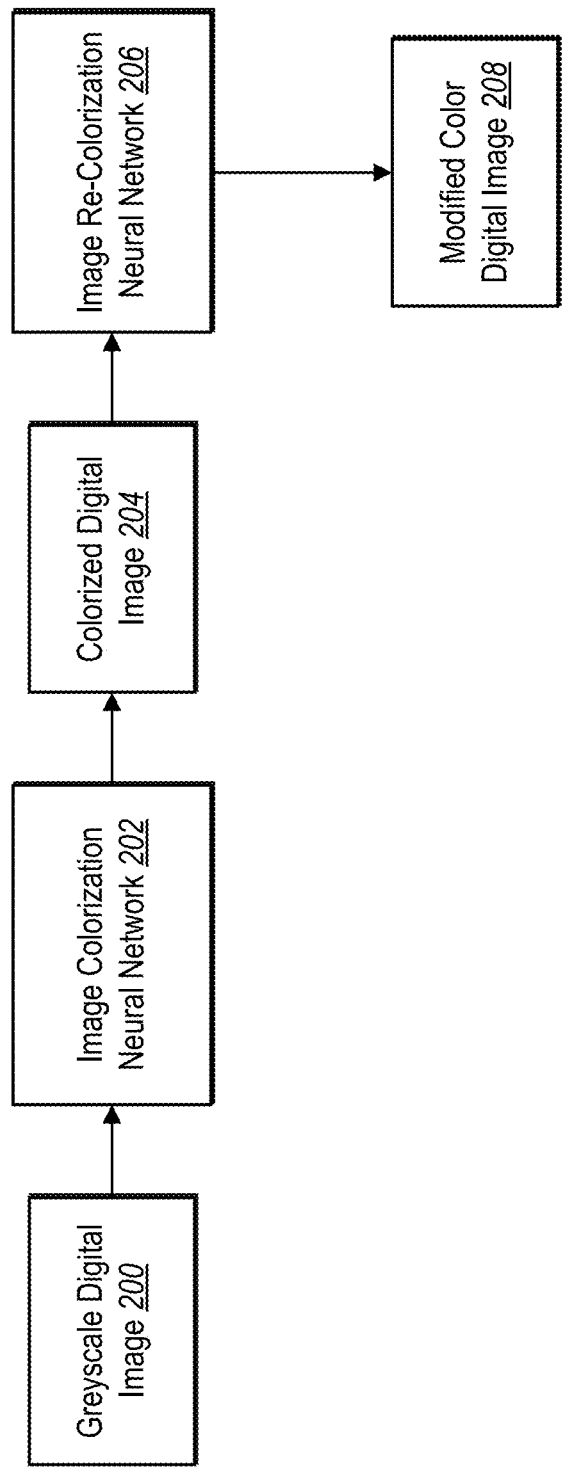
FIGS. 2A-2B illustrate diagrams of embodiments of the image colorization system generating modified color digital images in accordance with one or more implementations.
Figure 2B:
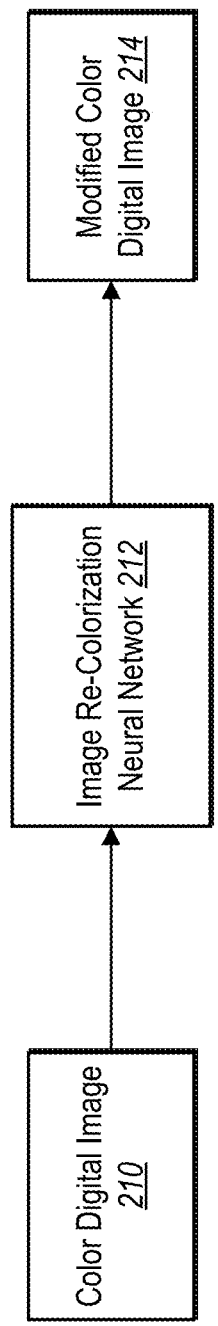

In one or more embodiments, the image colorization system 102 accurately, flexibly, and efficiently colorizes and/or re-colorizes digital images utilizing one or more stages of the two-stage image colorization neural network 112. Specifically, in one or more embodiments, the image colorization system 102 generates modified digital images by colorizing/re-colorizing individual regions of digital images based on local hints. FIG. 2A illustrates an embodiment in which the image colorization system 102 utilizes a multi-stage colorization process to generate a modified color digital image based on a grayscale digital image. FIG. 2B illustrates an embodiment in which the image colorization system 102 utilizes a single-stage re-colorization process to generate a modified color digital image from a color digital image.

As mentioned, FIG. 2A illustrates that the image colorization system 102 utilizes a multi-stage colorization process to produce a modified color digital image based on a grayscale digital image 200 or other non-color digital image such as a "black-and-white" photograph that does not have color information for objects in a scene (e.g., portraits). In one or more embodiments, the image colorization system 102 utilizes an image colorization neural network 202 to generate a colorized digital image 204. More specifically, the image colorization neural network 202 generates the colorized digital image 204 by automatically colorizing the grayscale digital image 200 according to predicted color values for pixels in the grayscale digital image 200.

Additionally, after generating the colorized digital image 204 as an intermediate image by utilizing the image colorization neural network 202, the image colorization system 102 utilizes an image re-colorization neural network 206 to generate a modified color digital image 208. In particular, the image colorization system 102 utilizes the image re-colorization neural network 206 to generate the modified color digital image 208 by changing colors of pixels in one or more objects based on color information from the colorized digital image 204 and local hints according to user inputs. The embodiment of FIG. 2A thus illustrates that the image colorization system 102 provides automatic colorization and then user-guided re-colorization.

As indicated previously, FIG. 2B illustrates an additional embodiment in which the image colorization system 102 utilizes a single-stage re-colorization process. Specifically, FIG. 2B illustrates that the image colorization system 102 provides a color digital image 210 to an image re-colorization neural network 212 to generate a modified color digital image 214. In one or more embodiments, the image colorization system 102 provides the color digital image 210 (e.g., an existing color photograph, color drawing, color computer generated image) to the image re-colorization neural network 212.

Because the color digital image 210 includes stored color information for the pixels in the color digital image 210, the image colorization system 102 extracts the color information. The image colorization system 102 then utilizes the extracted color information to replace colors of one or more objects in the color digital image 210 with selected colors indicated by local hints according to user inputs. The image colorization system 102 thus generates the modified color digital image 214 with one or more objects re-colorized to include different pixel values than in the color digital image 210.

By utilizing different processes for colorizing and re-colorizing digital images, the image colorization system 102 provides flexibility to perform various color modifications to non-color digital images or existing color digital images. In particular, the image colorization system 102 provides a fast method for automatically colorizing non-color digital images without requiring user involvement in the process. Additionally, as described in more detail below, the image colorization system 102 provides a significant amount of user control over the intelligent re-colorization of digital images in an intuitive and efficient process.

Figure 3A:
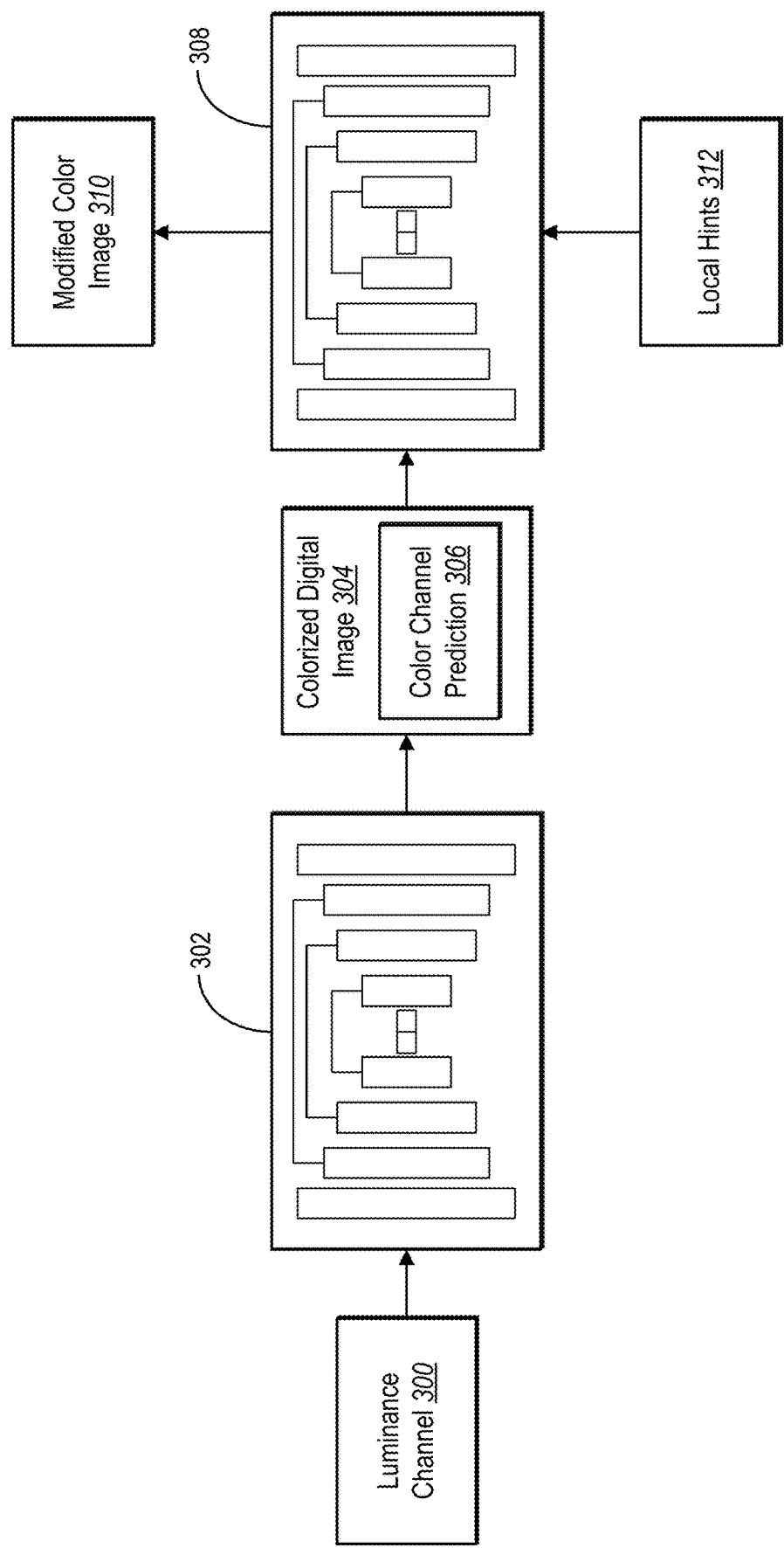
FIGS. 3A-3B illustrate diagrams of embodiments of the image colorization system generating modified color digital images in accordance with one or more implementations.
Figure 3B:
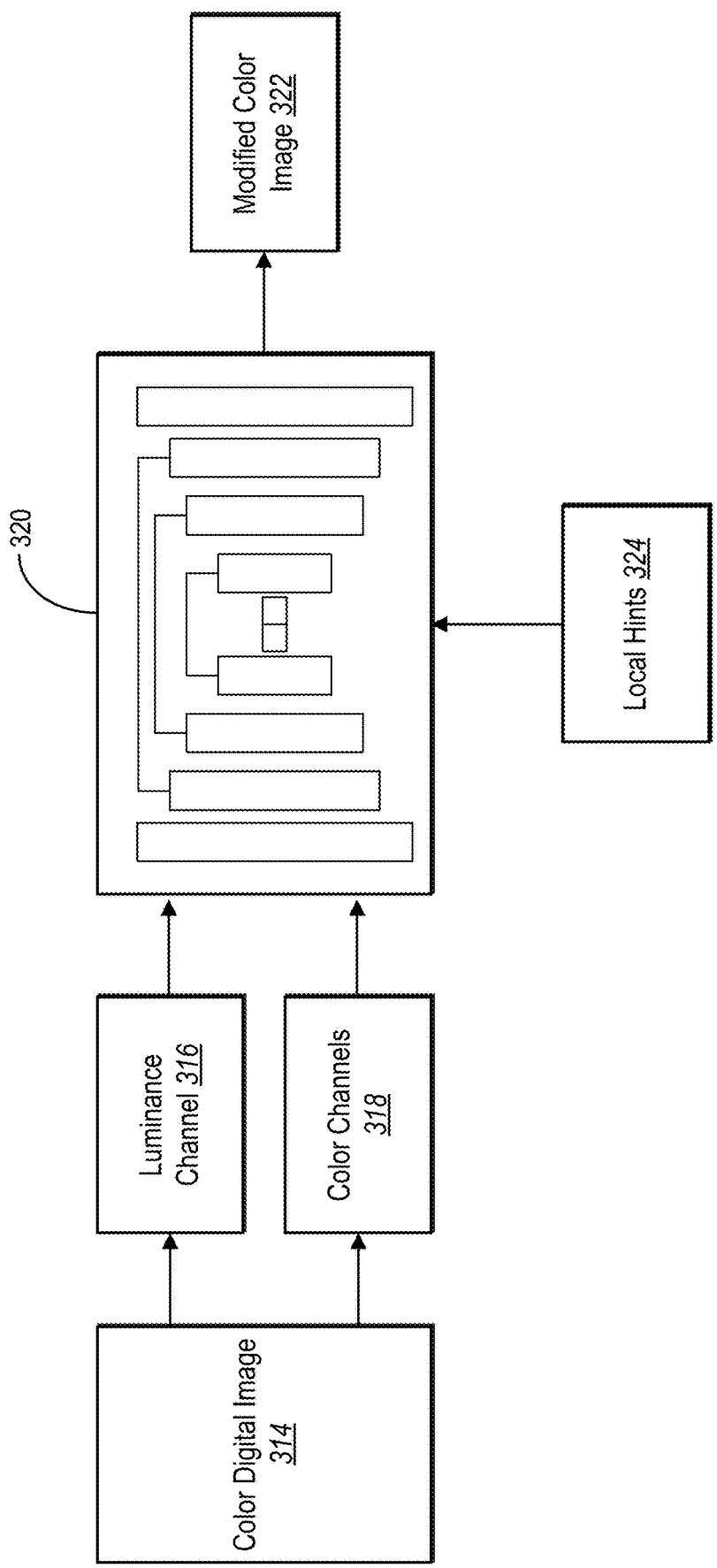

FIGS. 3A-3B illustrate more detailed diagrams of the colorization and re-colorization processes of FIGS. 2A-2B. Specifically, FIG. 3A illustrates additional detail in a multi-stage process for colorizing a grayscale digital image and then re-colorizing the colorized digital image. Furthermore, FIG. 3B illustrates additional detail in a single-stage process for re-colorizing a color digital image.

As illustrated in FIG. 3A, the image colorization system 102 provides a luminance channel 300 to an image colorization neural network 302 (i.e., the first stage of a two-stage image colorization neural network 112). In one or more embodiments, the image colorization system 102 determines the luminance channel 300 from a grayscale digital image. For instance, the image colorization system 102 determines the luminance channel 300 by converting the grayscale digital image to L*a*b color space and then extracts the luminance channel 300 from the grayscale digital image.

After providing the luminance channel 300 to the image colorization neural network 302, the image colorization system 102 utilizes the image colorization neural network 302 to generate a colorized digital image 304. In particular, the image colorization neural network 302 utilizes the luminance channel 300 including pixel values for a plurality of pixels in the initial grayscale digital image to generate color channel predictions 306. More specifically, the color channel predictions 306 include a plurality of color values corresponding to the pixels from the initial grayscale digital image. Accordingly, by generating a plurality of predicted color values for pixels of the grayscale digital image, the image colorization system 102 constructs the colorized digital image 304 from the predicted color values (e.g., from an array or matrix of values).

In one or more embodiments, the image colorization neural network 302 generates the color channel predictions 306 based on object segmentation and object classification for objects in the grayscale digital image. Additionally, in some embodiments, the image colorization neural network 302 utilizes the luminance channel 300 to determine some colors or shades of colors of objects in the grayscale digital image. For instance, the image colorization system 102 utilizes a combination of segmentation, object classification, and luminance values to accurately predict the colors of certain objects. To illustrate, the image colorization neural network 302 determines that face objects have a skin tone and then uses luminance values to determine the specific shade of skin tone.

Additionally, after generating the colorized digital image 304 by utilizing the image colorization neural network 302, FIG. 3A illustrates that the image colorization system 102 utilizes an image re-colorization neural network 308 (e.g., the second stage of a two-stage image colorization neural network 112) to generate a modified color image 310 based on the color channel predictions 306 of the colorized digital image. In one or more embodiments, the image colorization system 102 provides the color channel predictions 306 to the image re-colorization neural network 308. To illustrate, the image colorization system 102 determines the color channel predictions 306 as the chrominance values of the colorized digital image 304 in L*a*b color space. The image colorization system 102 thus provides the "ab" color channels to the image re-colorization neural network 308.

According to one or more embodiments, the image colorization system 102 also provides the luminance channel 300 from the grayscale digital image to the image re-colorization neural network 308. For example, while the image colorization neural network 302 generates the color channel predictions 306, in one or more embodiments, the image colorization neural network 302 does not alter the luminance channel 300 from the grayscale digital image to the colorized digital image 304. By providing the previously determined luminance channel 300 of the grayscale digital image to the image re-colorization neural network 308, the image colorization system 102 maintain consistency between the luminance in the grayscale digital image and the luminance in the modified color image 310 output by the image re-colorization neural network 308.

Additionally, the image colorization system 102 determines local hints 312 based on user inputs indicating specific locations in the colorized digital image 304. For example, the image colorization system 102 provides the colorized digital image 304 for display at a client device of a user to present the automatic colorization results. In one or more embodiments, the client device receives user inputs indicating one or more locations to further modify colors associated with one or more regions. The client device then provides the local hints 312 based on the user inputs to the image colorization system 102. In addition to indicating specific regions, in one or more embodiments, the local hints 312 also include selected colors (e.g., "ab" chrominance values) for changing the colors of the selected regions.

In response to determining the luminance channel 300, the color channel predictions 306, and the local hints 312, the image colorization system 102 utilizes the image re-colorization neural network 308 to generate the modified color image 310. In particular, the image re-colorization neural network 308 utilizes the luminance channel 300, the color channel predictions 306, and the local hints 312 to generate the modified color image 310. To illustrate, the image re-colorization neural network 308 replaces the color values in the color channel predictions 306 for the regions corresponding to the local hints 312 with the colors indicated by the local hints 312. More specifically, the image re-colorization neural network 308 generates a plurality of new predicted color channels for the selected regions based on the received color channel predictions 306. The image colorization system 102 uses the updated color channel predictions with the luminance channel 300 to generate the modified color image 310.

As mentioned, FIG. 3B illustrates additional detail for an embodiment in which the image colorization system 102 utilizes an image re-colorization neural network to modify colors in an existing image. Specifically, the image colorization system 102 receives or otherwise obtains a color digital image 314 including one or more objects with one or more color values. To illustrate, the color digital image 314 includes a color photograph, a cartoon image, a computer generated image, etc. Accordingly, the color digital image 314 includes a plurality of visibly distinct regions with color values assigned to the pixels in each region.

According to one or more embodiments, the image colorization system 102 extracts a luminance channel 316 and color channels 318 from the color digital image 314. For instance, the image colorization system 102 first converts the color digital image 314 from another color space (e.g., RGB color space) to L*a*b color space. The image colorization system 102 then obtains the "L" luminance value and "ab" chrominance values for each pixel in the color digital image 314. In some embodiments, the image colorization system 102 stores the extracted luminance channel 316 and color channels 318 in separate arrays.

In one or more embodiments, the image colorization system 102 provides the luminance channel 316 and the color channels 318 extracted from the color digital image 314 to an image re-colorization neural network 320. In particular, as mentioned, FIG. 3B illustrates a single-stage process for re-coloring digital images that have color vales. Accordingly, the image colorization system 102 utilizes second stage of the two-stage image colorization neural network 112 (i.e., the image re-colorization neural network 320) to generate a modified color image 322 based on the luminance channel 316 and the color channels 318 from the color digital image 314.

Furthermore, the image colorization system 102 obtains local hints 324 based on user inputs to provide to the image re-colorization neural network 320. In particular, the image re-colorization neural network 320 modifies specific regions to have specific colors indicated by the local hints 324 by changing the color values of the color channels 318 corresponding to the selected regions to the color values indicated by the local hints 324. The image colorization system 102 then generates the modified color image 322 by combining the luminance channel 316 from the color digital image 314 and the modified color channels (e.g., including the color values from the extracted color channels 318 and the local hints 324 in the appropriate regions).

Figure 4A:
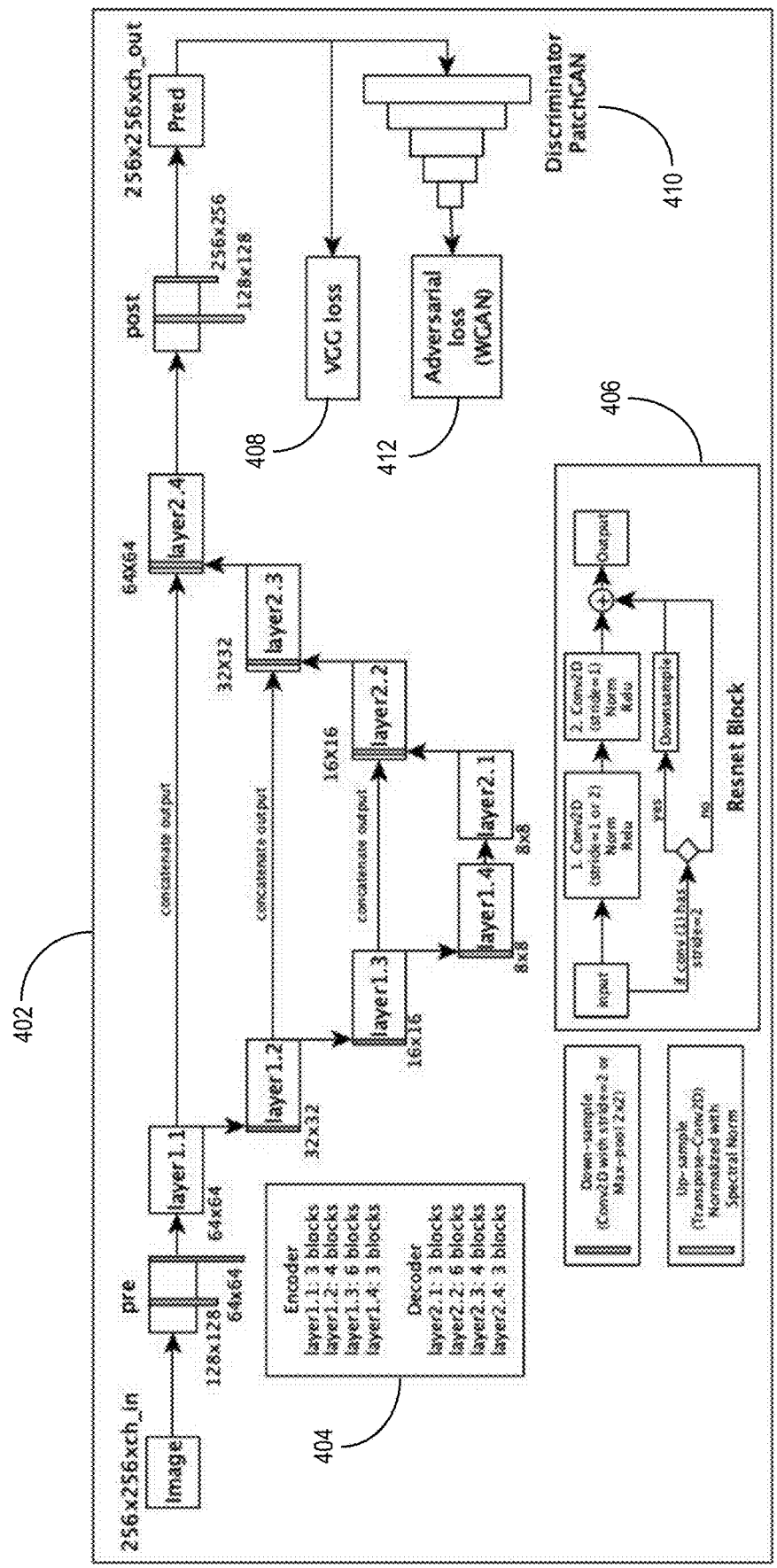
FIG. 4A illustrates an architecture of a re-colorization neural network and losses associated with the image re-colorization neural network in accordance with one or more implementations.

As mentioned, in certain described embodiments, the image colorization system 102 utilizes one or more neural networks to colorize or re-colorize a digital image. In particular, the image colorization system 102 utilizes an image colorization neural network and/or an image re-colorization neural network. FIG. 4A illustrates an example architecture of the image colorization neural network 302 and the image re-colorization neural network 308 of FIG. 3A in accordance with one or more embodiments. Furthermore, a first stage image colorization neural network for automatically colorizing a grayscale digital images utilizes a single input associated with a digital image (e.g., a luminance channel), while a second stage image re-colorization neural network for re-colorizing portions of a color digital image utilizes a plurality of inputs associated with a digital image (e.g., a luminance channel, color channels, and local hints).

As illustrated in FIG. 4A, the neural network 402 of the two-stage image colorization neural network 112 includes an encoder neural network and a decoder neural network. In particular, the table 404 indicates the layers of the neural network 402 of the two-stage image colorization neural network 112 that are part of the encoder neural network and the layers that are part of the decoder neural network. As shown, the decoder neural network includes a mirrored version of the encoder neural network, where the layers that make up the decoder mirror those that make up the encoder. Indeed, the encoder is structured in the order: 3 blocks, 4 blocks, 6 blocks, and 3 blocks in its respective layers. Conversely, the decoder is structured: 3 blocks, 6 blocks, 4 blocks, and 3 blocks—a mirrored version of the encoder.

As illustrated, the image colorization system 102 inputs a W×H×3 color digital image ("Image") into the neural network 402 of the two-stage image colorization neural network 112, whereupon the encoder neural network (e.g., layer1.1 through layer1.4) encodes the digital image into features using its respective layers. For instance, the layers of the encoder downsample and convolve the input as indicated by the sample block in the key 406 (e.g., beginning with "input" and ending with "output"). As shown, the encoder and the decoder have four types of residual blocks: 64×64 (3 blocks), 32×32 (4 blocks), 16×16 (6 blocks), and 8×8 (3 blocks).

In addition, the image colorization system 102 passes the encoded features to the decoder (e.g., layer2.1 through layer2.4), whereupon the decoder decodes the features to generate a predicted output ("Pred") in the form of a prediction of size W×H×2 including pixel values represented by luminance and chrominance values in L*a*b color space. In one or more embodiments, the output is not bound by tanh to the interval [−1,1]. Instead, the predicted values are within this range if the network's inputs are within [−1,1].

As shown in the key 406, the decoder layers upsample the features to generate the predicted pixel values at the resolution of the initial input image. Also as shown, the neural network 402 of the two-stage image colorization neural network 112 concatenates outputs at various layers to pass from the encoder to the decoder as part of generating the predicted pixel values. In one or more embodiments, the neural network 402 of the two-stage image colorization neural network 112 is modeled after the UNet-Resnet network with spectral normalization described by Olaf Ronneberger, Philipp Fischer, and Thomas Brox in "U-Net: Convolutional Networks for Biomedical Image Segmentation," arXiv:1505.04597v1 (2015), the entire contents of which are incorporated by reference herein.

In one or more embodiments, the neural network 402 of the two-stage image colorization neural network 112 includes two parts. In particular, the neural network 402 of the two-stage image colorization neural network 112 includes a generator that represents a feed-forward reconstruction convolutional neural network with skip connections. Additionally, the neural network 402 of the two-stage image colorization neural network 112 includes a discriminator neural network for adversarial training of the generator. By using skip connections (e.g., in residual blocks) in the encoder and decoder, the image colorization system 102 provides improved training as the gradient becomes smoother. Additionally, in one or more embodiments, the image colorization system 102 uses pre-trained weights in the encoder of the generator for classification. According to some embodiments, the image colorization system 102 utilizes spectral normalization in the decoder before every increase in size of the feature map to improve the training stability.

In one or more embodiments, the image colorization system 102 utilizes a combined loss for training the neural networks utilized at each stage of a colorization/re-colorization process. For example, as illustrated in FIG. 4A, the image colorization system 102 determines an objective function including a perceptual loss 408 ("VGG loss") between predicted digital images based on the output of the neural network 402 of the two-stage image colorization neural network 112 and ground truth images. Specifically, in one or more embodiments, the image colorization system 102 utilizes a pre-trained convolutional neural network to compare the L2 loss of feature maps from the convolutional blocks in the pre-trained network. To illustrate, the perceptual loss 408 is represented as:

$$\mathcal{L}_{VGG} = \mathcal{L}_{feat}^{\phi,j}(\hat{y}, y) = \frac{1}{C_j H_j W_j} \|\phi_j(\hat{y}) - \phi_j(y)\|_2^2$$

in which y and $\hat{y}$ represent the ground truth digital image and predicted digital image, respectively. Additionally, $\phi$ represents the pre-trained convolutional neural network, and $C_j H_j W_j$ are the dimensions of the output feature maps for the output of the pre-trained convolutional neural network corresponding to the convolutional block j.

In additional embodiments, the image colorization system 102 determines an L1 loss defined as $\mathcal{L}_{L1} = \Sigma|\hat{y} - y|$ to use in addition to the perceptual loss 408. Specifically, the image colorization system 102 determines a total generator loss for the neural network 402 of the two-stage image colorization neural network 112 for automatic colorization as $\mathcal{L}_{G(auto)} = m_1 \mathcal{L}_{VGG} + m_2 \mathcal{L}_{L1}$, in which $m_1=1$ and $m_2=10$. The image colorization system 102 can provide more stable predictions with the inclusion of the L1 loss. For example, by utilizing the L1 loss in connection with a perceptual loss, the image colorization system 102 provides more accurate colorization by reducing noise in the predicted colors of the resulting digital images.

In some embodiments, as illustrated in FIG. 4A, the image colorization system 102 utilizes a discriminator neural network 410 in a generative adversarial network to determine an adversarial loss 412 for the objective function. In particular, the image colorization system 102 utilizes a plurality of training epochs with the perceptual loss 408 and the L1 loss followed by a joint optimization with the discriminator neural network 410 for additional iterations. For example, the adversarial loss 412 includes functions represented as:

$$\mathcal{L}_{G\,adv.} = \frac{1}{HW} \sum D(G(x))$$

$$\mathcal{L}_{D\,adv.} = \frac{1}{HW} \sum D(x) - \frac{1}{HW} \sum D(G(x))$$

where D corresponds to the discriminator neural network 410, and G corresponds to the generator neural network (e.g., the image re-colorization neural network 402). Additionally, H and W represent the height and width, respectively, of the output of the discriminator neural network 410 (e.g., 30). Accordingly, the total loss for training the generator and discriminator jointly is:

$$\mathcal{L}_{G\,auto\,total} = \mathcal{L}_{G(auto)} + m_3 \mathcal{L}_{G\,adv.}$$

$$\mathcal{L}_D = m_4 \mathcal{L}_{D\,adv.}$$

where $m_3=0.01$ and $m_4=0.5$.

Figure 4B:
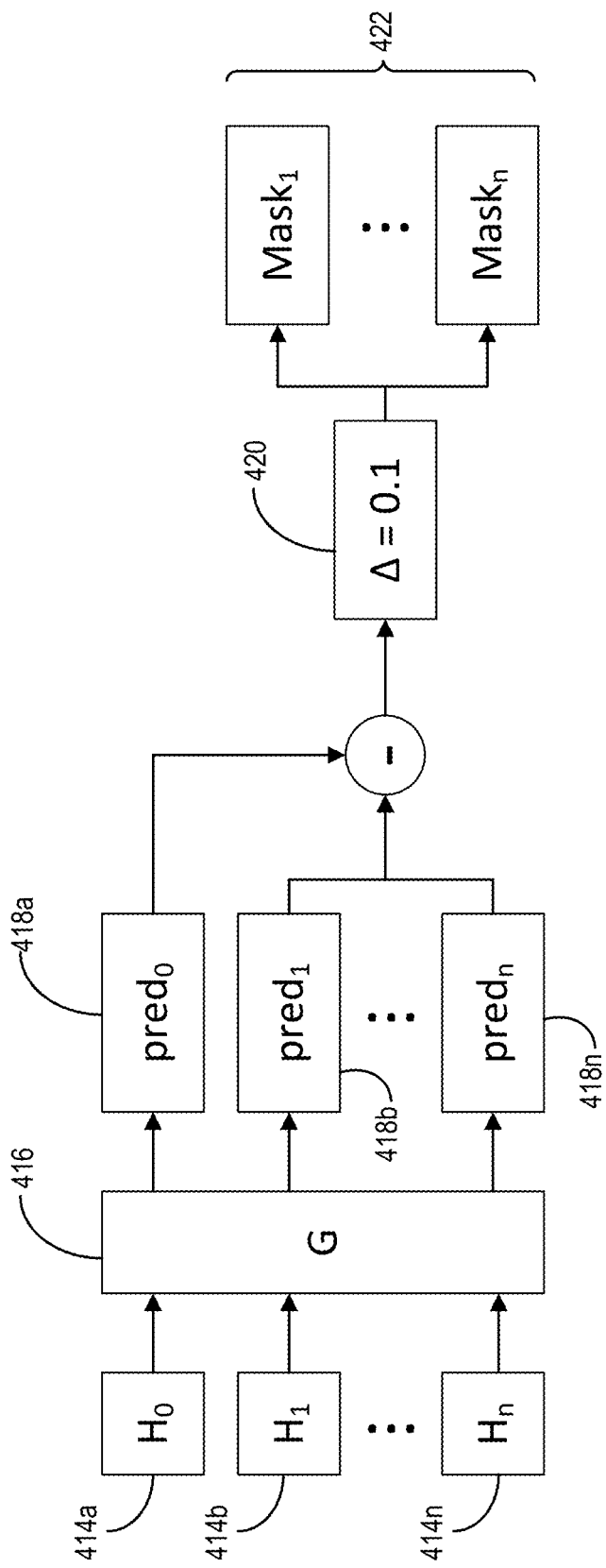
FIGS. 4B-4C illustrate diagrams of the image colorization system determining a local hints region loss for a re-colorization neural network in accordance with one or more implementations.
Figure 4C:
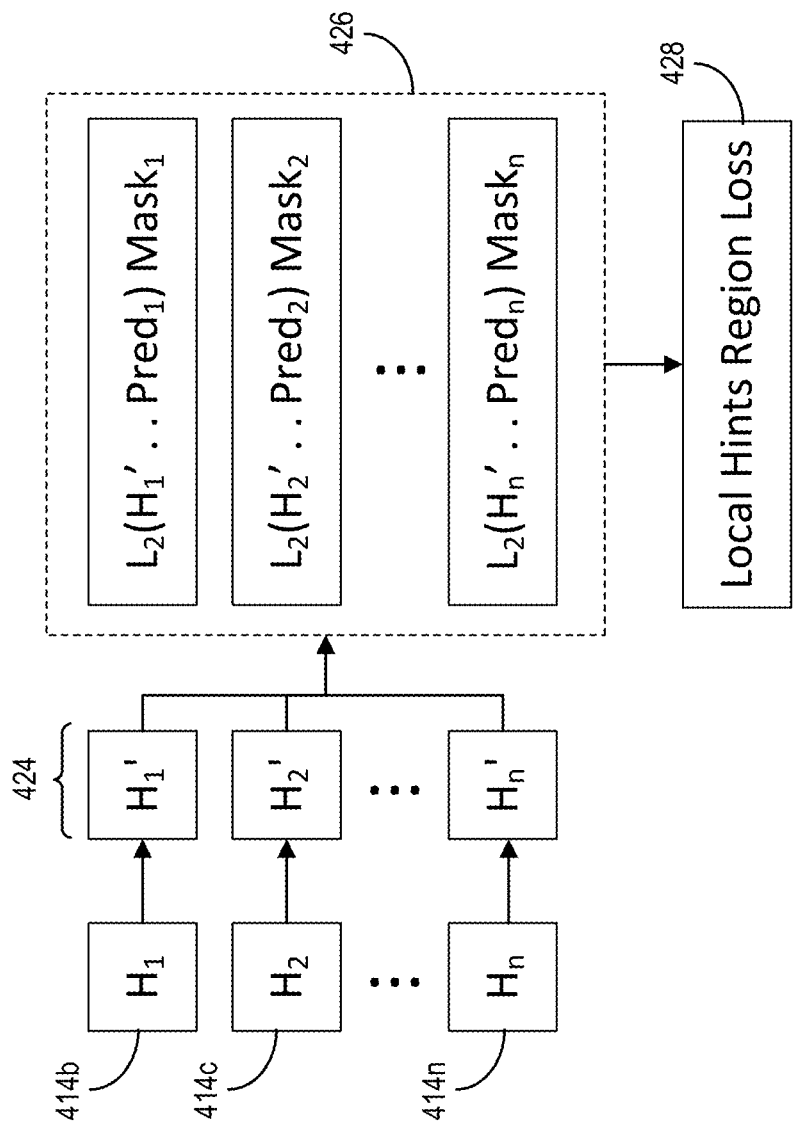

In addition to the above losses, in one or more embodiments, the image colorization system 102 determines a local hints region loss to improve the ability of the image re-colorization neural network of the two-stage image colorization neural network 112 during a re-colorization stage to reduce the global impact of each local hint on a predicted digital image as a whole. Specifically, FIGS. 4B-4C illustrate diagrams in which the image colorization system 102 determines a local hints region loss for training the image re-colorization neural network of the two-stage image colorization neural network. FIG. 4B illustrates a diagram in which the image colorization system 102 determines masks for a plurality of local hints. FIG. 4C illustrates a diagram in which the image colorization system 102 determines a local hints region loss from the generated masks.

In one or more embodiments, as illustrated in FIG. 4B, the image colorization system 102 provides a plurality of hints 414a-414n to an image re-colorization neural network 416 to generate a plurality of predictions 418a-418n. Specifically, the image colorization system 102 determines a first prediction 418a representing an automatic colorization prediction with a first hint 414a that indicates to the two-stage image colorization neural network 112 to automatically colorize an entire digital image without specifying any individual regions. Additionally, the image colorization system 102 determines a plurality of region predictions 418b-418n for a plurality of regions indicated by a plurality of hints 414b-414n.

After generating the automatic colorization prediction (i.e., the first prediction 418a) and a plurality of additional region predictions (i.e., region predictions 418b-418n), the image colorization system 102 determines a threshold difference between the first prediction 418a and each of the region predictions 418b-418n. For example, FIG. 4B illustrates that the image colorization system 102 determines whether the difference between the automatic colorization prediction and each region prediction exceeds the determined threshold value 420 (e.g., 0.1). The image colorization system 102 then generates a plurality of masks 422 based on the resulting thresholded differences.

FIG. 4C illustrates that the image colorization system 102 generates a local hints region loss for a plurality of hints based on the masks 422 of FIG. 4B. For instance, as illustrated in FIG. 4C, the image colorization system 102 first determines broadcasted values 424 based on the previously determined hints 414b-414n indicating specific regions of a digital image. The image colorization system 102 then determines a plurality of separate region losses 426 corresponding to the plurality of hints 414b-414n based on the broadcasted values 424 and the masks 422. Finally, the image colorization system 102 combines the separate region losses 426 into the local hints region loss 428, which the image colorization system 102 then uses to learn parameters of the image re-colorization neural network 416.

In one or more embodiments, $\hat{y}_{auto}$ represents the automatic colorization prediction, $\hat{y}_j$ represents the prediction for a given local hint (e.g., predicted values for a region), and $lh_{ab,j}$ represents the chrominance "ab" values of the local hint. In one or more embodiments, the image colorization system 102 computes a mask for each local hint by thresholding a difference between the automatic colorization prediction and the prediction for the local hint as $mask_j = \{\hat{y}_{auto} - \hat{y}_j > 0.1\}$. The image colorization system 102 then determines the local hints region loss as the L1 loss between $lh_{ab,j}$, $\hat{y}_j$, and a margin as $\mathcal{L}_{LHregion} = \Sigma_{i,j} |\hat{y}_j - lh_{ab,j} + margin| * mask_j$, where margin=0.05 (in one embodiment), and i corresponds to the digital image in a mini batch. The total generator loss when training an image re-colorization neural network 416 is thus $\mathcal{L}_{G(LH)} = m_1 \mathcal{L}_{VGG} + m_2 \mathcal{L}_{L1} + m_2 \mathcal{L}\_LHregion$. In one or more embodiments, the image colorization system 102 also trains the image re-colorization neural network 416 with the adversarial loss 412 above to improve the vibrancy of the predicted colors as:

$$\mathcal{L}_{G\ LH\ total} = \mathcal{L}_{G(LH)} + m_3 \mathcal{L}_{G\ adv}.$$

$$\mathcal{L}_D = m_4 \mathcal{L}_{D\ adv}.$$

Figure 4D:
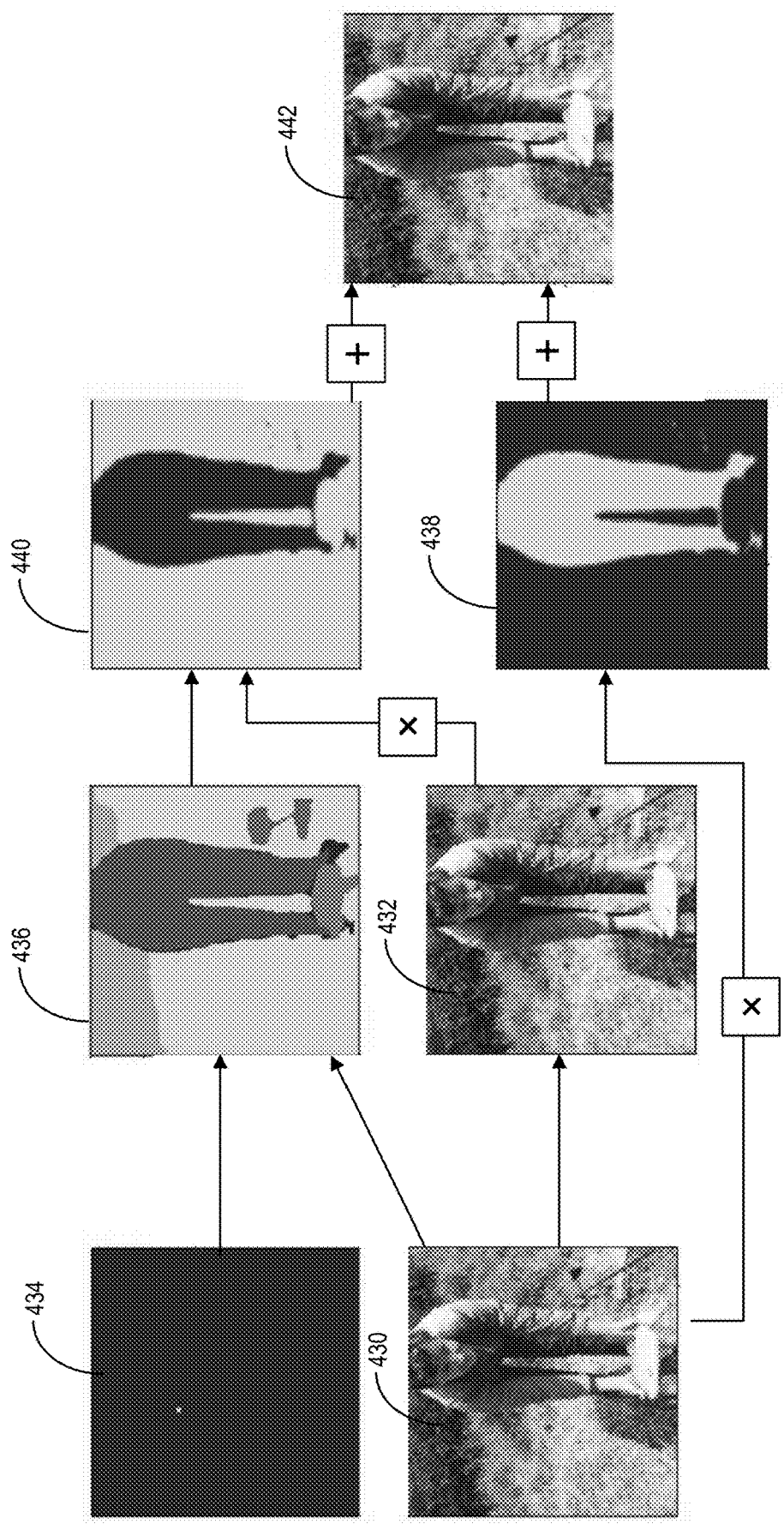
FIG. 4D illustrates a diagram of ground truth image augmentation based on a segmentation map and sampled local hints in accordance with one or more implementations.

In addition to determining a plurality of losses for training an image re-colorization neural network 416 for both the automatic colorization and re-colorization processes, in one or more embodiments, the image colorization system 102 uses an image re-colorization neural networks to augment ground truth digital images. Specifically, the image colorization system 102 generates a blended digital image including colors from a ground truth digital image and an automatically colorized digital image to train the image re-colorization neural network to maintain input colors from regions not affected by local hints. FIG. 4D illustrates a diagram of the image colorization system 102 generating a blended digital image from a digital image and a colorized digital image.

In one or more embodiments, as illustrated in FIG. 4D, the image colorization system 102 utilizes an image re-colorization neural network to process a ground truth digital image 430 that includes color values for pixels in the ground truth digital image 430. In particular, the image colorization system 102 utilizes the image colorization neural network to generate a colorized digital image 432 based on the luminance of the ground truth digital image 430. For instance, the image colorization system 102 assigns new color values to each pixel in the colorized digital image 432 (e.g., by converting the ground truth digital image to a grayscale digital image and then colorizing the grayscale digital image).

In connection with colorizing the ground truth digital image 430, the image colorization system 102 samples a plurality of local hints (e.g., local hint 434) from the ground truth digital image 430. Additionally, in one or more embodiments, the image colorization system 102 (or another system) utilizes a segmentation network to determine a region for each of the local hints by generating a segmentation map 436 and then selecting the region corresponding to the location of the local hint. For instance, the image colorization system 102 determines the region of a local hint by determining the pixel coordinates of the local hint and then identifying the segment that includes the pixel coordinates of the local hint from the segmentation map 436.

In additional embodiments, the image colorization system 102 then generates a blend mask 438 from the ground truth digital image 430 corresponding the region identified for the local hint 434. For instance, the image colorization system 102 generates a mask including 1 values for pixels in the region corresponding to the local hint 434 and 0 values for pixels outside the identified region. Additionally, the image colorization system 102 generates a blend mask complement 440 that includes opposite values from the blend mask 438 (e.g., 0 values for the region corresponding to the local hint 434 and 1 values for the pixels outside the region).

After generating the blend mask 438 and the blend mask complement 440, the image colorization system 102 generates a blended digital image 442. Specifically, the image colorization system 102 keeps portions of the ground truth digital image 430 by multiplying the pixel values of the ground truth digital image 430 by the blend mask 438. The image colorization system 102 also keeps portions of the colorized digital image 432 by multiplying the pixel values of the colorized digital image 432 by the blend mask complement 440. The image colorization system 102 then combines the resulting pixel values to generate the blended digital image 442. In one or more embodiments, the image colorization system 102 then utilizes the ground truth digital image 430 and the blended digital image 442 to further train the image re-colorization neural network.

According to one or more embodiments, the image colorization system 102 (or another system) augments ground truth digital images by utilizing a panoptic segmentation network. An example, panoptic segmentation network is disclosed in U.S. patent application Ser. No. 17/319,979 filed on May 13, 2021, the entire contents of which are hereby incorporated by reference in their entirety. In particular, the image colorization system 102 utilizes the panoptic segmentation network to generate a prediction $\hat{m}_j$ from an input image $x_j$. The image colorization system 102 determines a collection of k sampled local hints $lh_{ab,k}$ from a ground truth digital image. The image colorization system 102 then uses the collection k to define regions to be sourced from the automatic colorization prediction $\hat{y}_{auto,j}$ of image $x_j$.

Furthermore, for each l region in the segmentation prediction $\hat{m}_j$, the image colorization system 102 determines whether there are any overlapping $lh_{ab,k}$ local hints. If the image colorization system 102 determines that there are overlapping hints, the image colorization system 102 keeps the color information for the corresponding region from the ground truth digital image. If the l region in $\hat{m}_j$ does not contain any overlapping $lh_{ab,k}$ local hints, the image colorization system 102 copies the area from the automatic colorization prediction $\hat{y}_{auto,j}$. Because $\hat{y}_{auto,j}$ is included in the input to the image re-colorization neural network, the image colorization system 102 establishes an identify function between the regions not affected by local hints, which is the same in scenarios in which the image re-colorization neural network does not receive any local hints.

Figure 5:
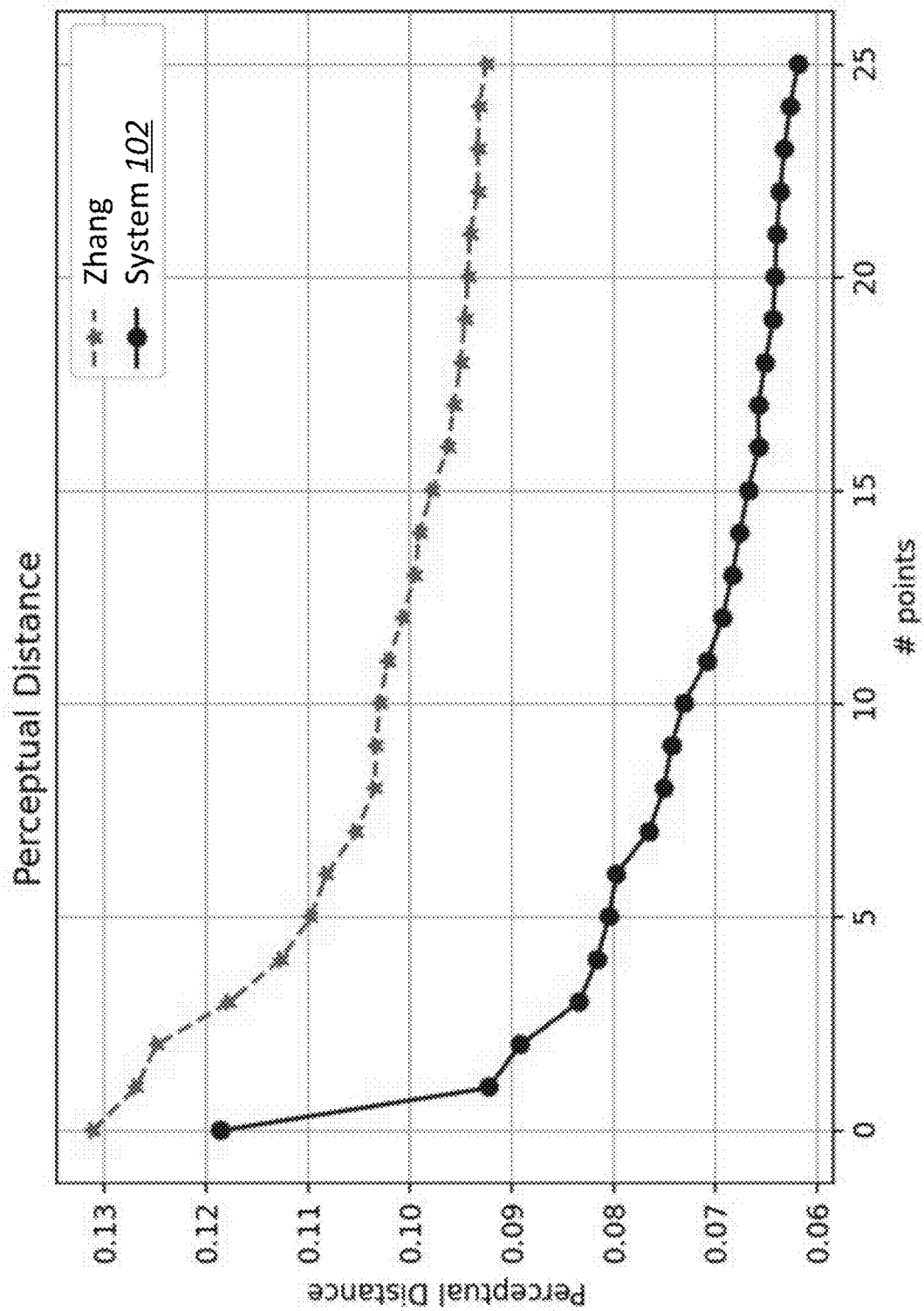
FIG. 5 illustrates a graph diagram of a comparison of perceptual distance associated with the image colorization system and a conventional image editing system in accordance with one or more implementations.

In one or more embodiments, the image colorization system 102 evaluated the impact of adding local hints to a re-colorization output of a re-colorization neural network. Specifically, the image colorization system 102 utilized an evaluation based on the perceptual distance between two images based on a perceptual metric as described by Alex Krizhevsky, Ilya Sutskever, and Geoffrey E. Hinton in "Imagenet classification with deep convolutional neural networks," Advances in neural network information processing systems 25, (2012): 1097-1105. In particular, the image colorization system 102 used a set of 50 images that were manually edited to color objects or regions with a different color (relative to ground truth). FIG. 5 illustrates a diagram indicating a comparison of perceptual distance for a plurality of different numbers of local hints between the outputs of the image colorization system 102 and outputs of a conventional system as described by Richard Zhang, Jun-Yah Zhu, Phillip Isola, Xinyang Geng, Angela S. Lin, Tianhe Yu, and Alexei A. Efros in "Real-time user-guided image colorization with learned deep priors," arXiv preprint arXiv: 1705.02999 (2017) (hereinafter "Zhang"). As illustrated, the image colorization system 102 outperforms Zhang due to the architecture used and the combination of losses and image augmentation, as described above.

In one or more embodiments, the image colorization system 102 also determined a training dataset based on Imagenet and a plurality of additional datasets including images of humans and faces. Imagenet is described by Jia Deng, Wei Dong, Richard Socher, Li-Jia Li, Kai Li, and Li Fei-Fei in "Imagenet: a large-scale hierarchical image database," 2009 IEEE conference on computer vision and pattern recognition, pp. 248-255. Ieee, 2009. In particular, the image colorization system 102 removed black and white images from the Imagenet dataset to train the image re-colorization neural network for colorization. During training, the image colorization system 102 utilized a combination of validation and a collection of legacy photos for evaluation.

Furthermore, the image colorization system 102 modified the images from the training dataset to bring the images closer to the use-case of old photograph colorization. Specifically, the image colorization system 102 used an augmentation pipeline that included several elements. First, the image colorization system 102 utilized a plurality of different blur filters, noise filters, and texture blends to give the images the appearance of legacy photos. Furthermore, in one or more embodiments, the image colorization system 102 modified images using half-tone simulation.

Figure 6A:
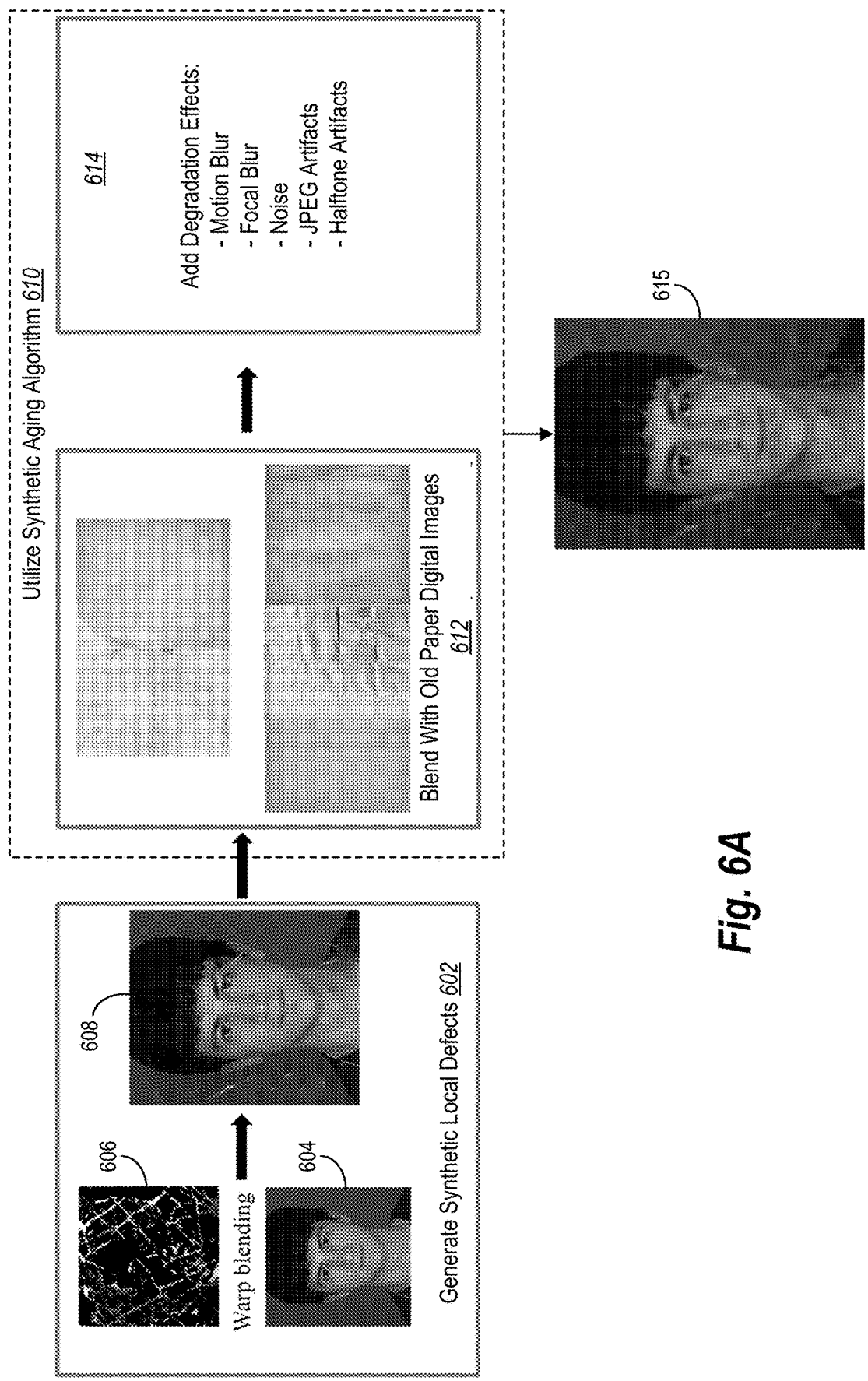
FIGS. 6A-6B illustrate diagrams of a process for generating sample defect digital images for training a neural network in accordance with one or more implementations.
Figure 6B:
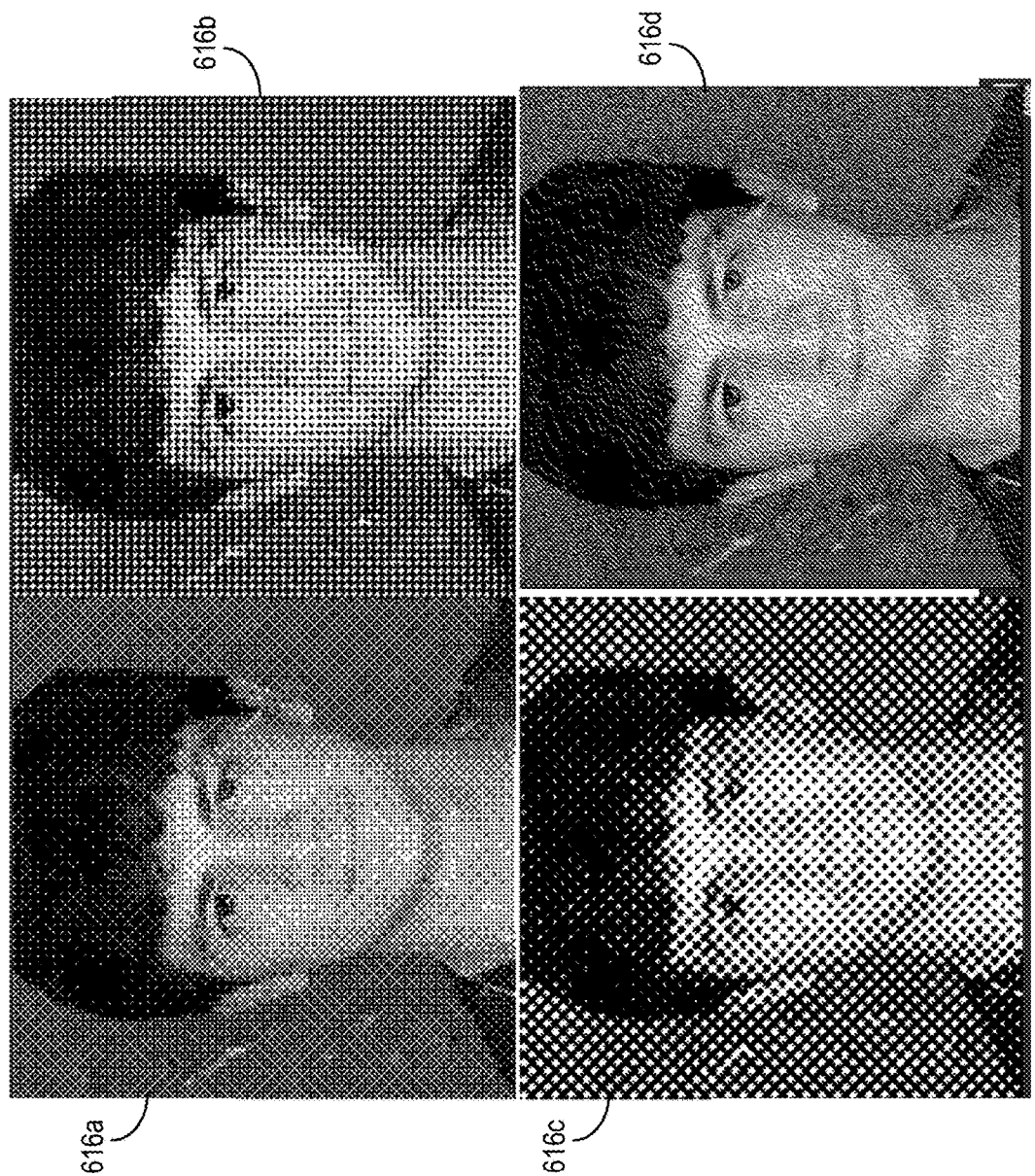

For example, FIGS. 6A-6B illustrate embodiments of the image colorization system 102 modifying digital images to augment a training dataset to make the images appear more similar to old photographs. Specifically, FIG. 6A illustrates an overview of generating sample defect digital images, while FIG. 6B provides additional detail of specific acts involved. By utilizing the sample image generation described in relation to FIG. 6B, the image colorization system 102 generates realistic, natural, and challenging digital images for diverse, robust training that results in accurate performance of a neural network that colorizes or re-colorizes digital images for domain-specific artifacts such as compression artifacts, various types of noise, or damage to photographs (e.g., tears or cuts).

As illustrated in FIG. 6A, the image colorization system 102 performs an act 602 to generate synthetic local defects. More specifically, the image colorization system 102 generates synthetic local defects by combining or blending local defect images with sample digital images. In some cases, a local defect image includes a digital image that depicts or portrays one or more local defects. For example, a local defect image depicts a pattern of scratches or tears without depicting anything else.

As shown, the image colorization system 102 blends a local defect image 606 with a sample digital image 604 (e.g., a sample digital image depicting a face). For instance, the image colorization system 102 utilizes a warp blending technique to blend the local defect image 606 with the sample digital image 604. Thus, the image restoration system 102 generates the blended defect digital image 608. In some cases, a blended defect digital image includes a digital image that depicts or portrays a face (or some other image) from a sample digital image combined with local defects from a local defect image.

As further illustrated in FIG. 6A, the image colorization system 102 performs an act 610 to utilize a synthetic aging algorithm. More particularly, the image colorization system 102 ages or "oldifies" the blended defect digital image 608 to further simulate or imitate old, historic images. In some cases, a synthetic aging algorithm includes one or more instructions, processes, or acts to artificially age a digital image (e.g., to make the digital image appear older).

As part of the synthetic aging algorithm, the image colorization system 102 performs an act 512 to blend the blended defect digital image 608 with one or more old paper digital images (e.g., digital images depicting aged, old pieces of paper). For example, the image restoration system 102 utilizes a blending method such as grain merging or dodge blending to blend an old paper digital image with the blended defect digital image 608. In some cases, the image colorization system 102 implements a blending method to only lighten various pixels of the blended defect digital image 508.

In some embodiments, as a further part of the synthetic aging algorithm, the image colorization system 102 also performs an act 614 to add degradation effects. In particular, the image colorization system 102 adds one or more degradation effects to the blended defect digital image 608 (before or after blending with an old paper digital image). In some embodiments, the image colorization system 102 adds degradation effects such as motion blur, focal blur, image noise, JPEG artifacts, and/or halftone artifacts. Indeed, in some cases, a degradation effect includes a visual effect or modification performed to a digital image to artificially make the digital image appear older or degraded.

By applying the synthetic aging algorithm via the act 612 and the act 614, the image colorization system 102 thus generates the sample defect digital image 615. As shown, the sample defect digital image 615 depicts a blurry, degraded, scratched version of the sample digital image 604. Indeed, the image colorization system 102 utilizes the sample defect digital image 615 for training purposes to learn parameters of an image colorization neural network or an image re-colorization neural network. The image colorization system 102 further generates additional sample defect digital images to utilize for learning parameters of the neural network(s) as well (e.g., to include within a training set).

By adding synthetic defects and synthetic aging to training digital images, the image colorization system 102 trains neural networks to be robust for a variety of different images that they may process during colorization/re-colorization tasks. Alternatively, although FIG. 6A illustrates that the image colorization system 102 generates sample defect digital images by generating synthetic local defects in addition to utilizing synthetic aging algorithms, in some embodiments, the image colorization system 102 applies only synthetic aging to digital images. For example, the image colorization system 102 utilizes degradation such as motion blur, focal blur, noise, JPEG artifacts, or half-tone artifacts to artificially age digital images without adding synthetic defects such as scratches or folds.

As mentioned above, in certain embodiments, the image colorization system 102 adds degradation effects to blended defect digital images as part of a synthetic aging algorithm. In particular, the image colorization system 102 adds degradation effects such as halftone artifacts. FIG. 6B illustrates example halftone artifacts that the image colorization system 102 generates and combines with blended defect digital images in accordance with one or more embodiments.

Figure 6C:
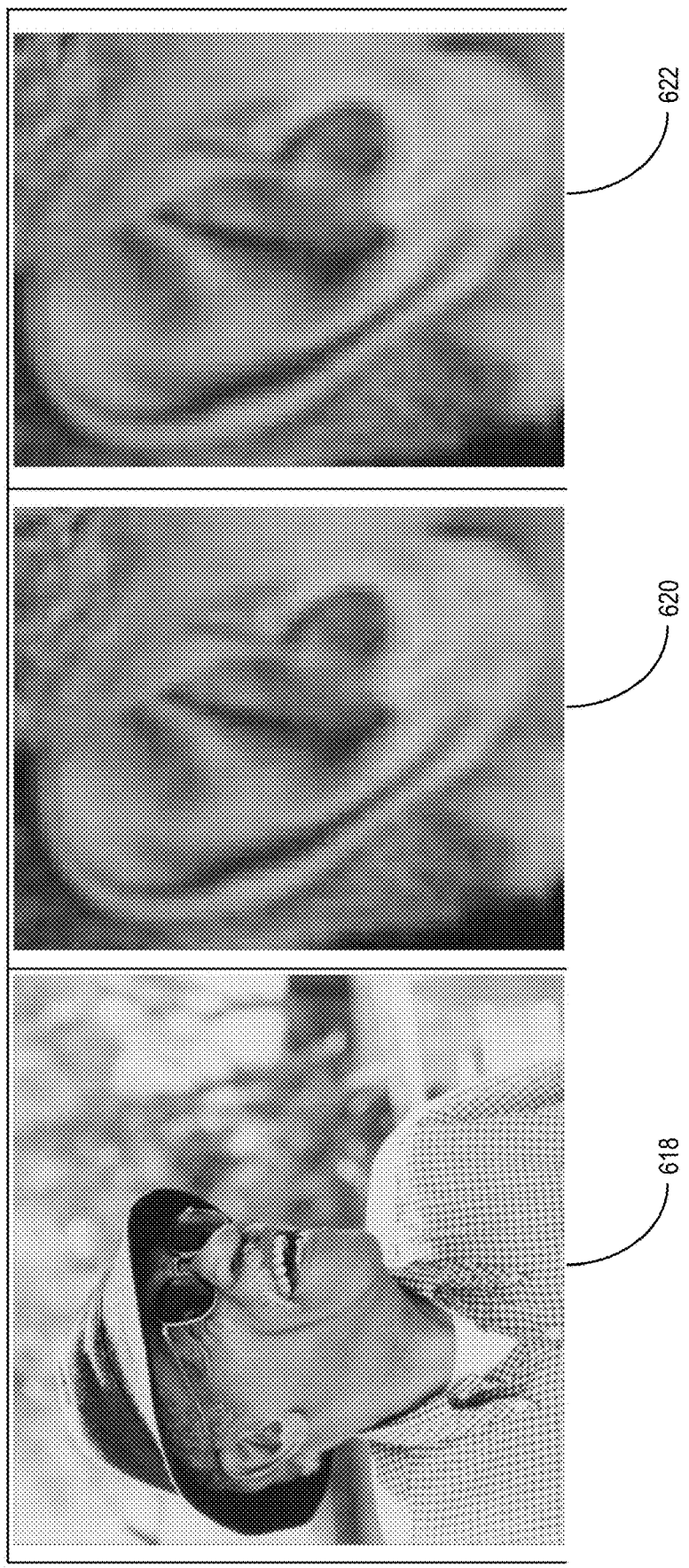
FIG. 6C illustrates digital images in connection with a post-processing operation utilizing a guided filter.

As illustrated in FIG. 6C, the image colorization system 102 generates different types of halftone artifact patterns. For example, the image colorization system 102 generates halftone artifacts such as the Bayer's Dispersed Dot pattern, the Bayer's Clustered Dot pattern, Ulichney's Clustered Dot pattern, Ulichney's Dispersed Dot pattern, and an error diffusion pattern. As shown, the image colorization system 102 adds these halftone artifact patterns to blended defect digital images to generate the sample defect digital images 616a-616d. Each of the sample defect digital images 616a-616d depicts a different type of halftone artifact pattern.

Not only does the image colorization system 102 add halftone artifacts, but the image colorization system 102 adds other degradation as part of the synthetic aging algorithm effects as well. For example, the image colorization system 102 adds motion blur to blur a blended defect digital image as if the camera was in motion at the time of capture. In some case, the image colorization system 102 adds focal blur to blur a blended defect digital image as if a camera lens was out of focus at the time of capture. In these or other cases, the image colorization system 102 adds noise and/or JPEG artifacts to blended defect digital images as well. Additionally (or alternatively), and as discussed above, the image colorization system 102 blends the blended defect digital images with old paper digital images as part of the synthetic aging algorithm.

Upon generating a set of sample defect digital images for training, the image colorization system 102 trains an image colorization neural network or an image re-colorization neural network. In particular, the image colorization system 102 repeats a number of acts of a training process for a number of epochs and/or until the neural network (e.g., neural network 402 of FIG. 4A) generates accurate color channels corresponding to the input luminance channel.

In some embodiments, the image colorization system 102 also utilizes additional post-processing operations to improve image quality after color prediction using the image re-colorization neural network. For example, as illustrated in FIG. 6C, the image colorization system 102 utilizes a guided filter to reduce noise while maintaining the strength of edges in the digital image. In particular, FIG. 6C illustrates a colorized digital image 618, a colorized region 620 including chromatic noise, and a filtered region 622 after applying the guided filter to the colorized region 620. One example of a guided image filter is disclosed by He et al., in "Guided Image Filtering," In European Conference on Computer Vision, pp. 1-14, Springer, Berlin, Heidelberg, 2010, the entire contents of which are hereby incorporated by reference in their entirety.

Figure 7:
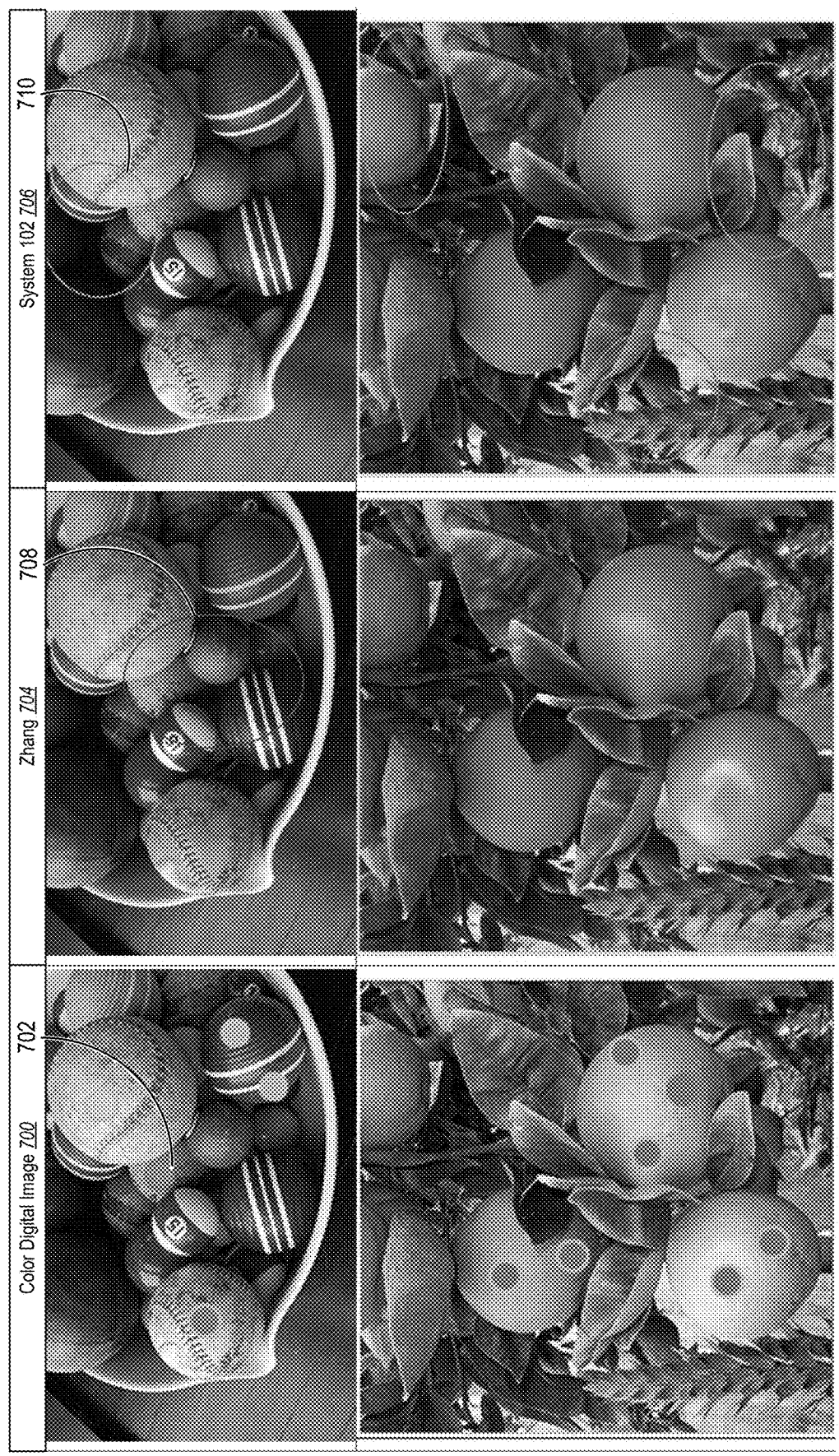
FIG. 7 illustrates a comparison of modified digital images generated by the image colorization system and modified digital images generated by a conventional image editing system in accordance with one or more implementations.

FIG. 7 illustrates comparisons of re-colorization of regions in digital images by the image colorization system 102 and a conventional system (Zhang). Specifically, as illustrated, each system (i.e., the image colorization system 102 and the conventional system) processed color digital images to generate re-colorized digital images according to specific colors based on local hints. For instance, for a color digital image 700, a user input indicated a plurality of local hints (e.g., local hint 702) for a plurality of different objects/regions in the first color digital image 700. Additionally, the local hints included target colors for modifying the colors in the indicated regions.

FIG. 7 illustrates a first modified digital image 704 based on the output of the conventional system and a second modified digital image 706 generated by the image colorization system 102. The image colorization system 102 generated more accurate images by limiting the global impact of the local hints. Specifically, a region 708 of the first modified digital image 704 produced by the conventional system included color bleeding across a plurality of different objects based on the local hint 702. In contrast the second modified digital image 704 limited the influence of the local hint 702 to the indicated object. Furthermore, the highlighted region 710 of the second modified digital image 706 indicates that the image colorization system 102 also maintained the correct colors from the color digital image 700 in objects without local hints.

Figure 8:
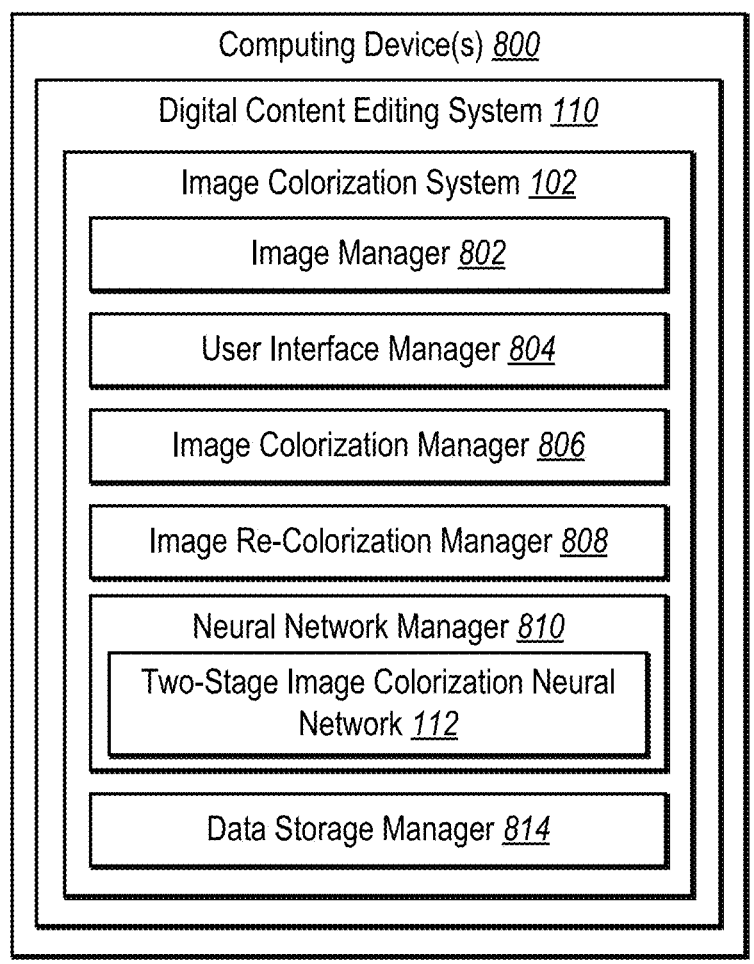
FIG. 8 illustrates a diagram of the image colorization system of FIG. 1 in accordance with one or more implementations.

FIG. 8 illustrates a detailed schematic diagram of an embodiment of the image colorization system 102 described above. As shown, the image colorization system 102 is implemented in a digital content editing system 110 on computing device(s) 800 (e.g., a client device and/or server device as described in FIG. 1, and as further described below in relation to FIG. 10). Additionally, in one or more embodiments, the image colorization system 102 includes, but is not limited to, an image manager 802, a user interface manager

804, an image colorization manager 806, an image re-colorization manager 808, a neural network manager 810 including a two-stage image colorization neural network 112, and a data storage manager 814. The image colorization system 102 can be implemented on any number of computing devices. In one or more embodiments, the image colorization system 102 is implemented in a distributed system of server devices for digital image editing. In alternative embodiments, the image colorization system 102 is implemented within one or more additional systems. Alternatively, the image colorization system 102 may be implemented on a single computing device such as a single client device.

In one or more embodiments, each of the components of the image colorization system 102 is in communication with other components using any suitable communication technologies. Additionally, in some embodiments, the components of the image colorization system 102 are in communication with one or more other devices including other computing devices of a user, server devices (e.g., cloud storage devices), licensing servers, or other devices/systems. It will be recognized that although the components of the image colorization system 102 are shown to be separate in FIG. 8, any of the subcomponents may be combined into fewer components, such as into a single component, or divided into more components as may serve a particular implementation. Furthermore, although the components of FIG. 8 are described in connection with the image colorization system 102, in one or more embodiments, at least some of the components for performing operations in conjunction with the image colorization system 102 described herein are implemented on other devices within the environment.

In some embodiments, the components of the image colorization system 102 include software, hardware, or both. For example, the components of the image colorization system 102 include one or more instructions stored on a computer-readable storage medium and executable by processors of one or more computing devices (e.g., the computing device(s) 800). When executed by the one or more processors, the computer-executable instructions of the image colorization system 102 can cause the computing device(s) 800 to perform the operations described herein. Alternatively, the components of the image colorization system 102 can include hardware, such as a special purpose processing device to perform a certain function or group of functions. Additionally, or alternatively, the components of the image colorization system 102 can include a combination of computer-executable instructions and hardware.

Furthermore, the components of the image colorization system 102 performing the functions described herein with respect to the image colorization system 102 may, for example, be implemented as part of a stand-alone application, as a module of an application, as a plug-in for applications, as a library function or functions that may be called by other applications, and/or as a cloud-computing model. Thus, the components of the image colorization system 102 may be implemented as part of a stand-alone application on a personal computing device or a mobile device. Alternatively, or additionally, the components of the image colorization system 102 may be implemented in any application that provides digital image modification, including, but not limited to ADOBE® PHOTOSHOP®, ADOBE® LIGHTROOM®, ADOBE® ILLUSTRATOR®, ADOBE® PHOTOSHOP® ELEMENTS, and ADOBE® CREATIVE CLOUD® software. "ADOBE," "PHOTOSHOP," "LIGHTROOM," "ILLUSTRATOR," and "CREATIVE CLOUD" are either registered trademarks or trademarks of Adobe Inc. in the United States and/or other countries.

As illustrated in FIG. 8, the image colorization system 102 includes an image manager 802 to manage digital images. In one or more embodiments, the image manager 802 manages grayscale digital images for colorizing the grayscale digital images. Additionally, the image manager 802 manages color digital images and colorized digital images for re-colorizing portions of the color/colorized digital images.

Additionally, the image colorization system 102 includes a user interface manager 804 to manage interactions with graphical user interfaces in digital editing applications. For example, the user interface manager 804 manages content within a digital editing application for editing digital images. To illustrate, the user interface manager 804 manages controls and tools for interacting with digital images including, but not limited to, user inputs to indicate local hints for selectively modifying colors of specific regions of digital images.

In additional embodiments, the image colorization system 102 includes an image colorization manager 806 to colorize digital images. In particular, the image colorization manager 806 utilizes a re-colorization neural network to generate colorization predictions for grayscale digital images. For example, the image colorization manager 806 communicates with the image manager 802 to obtain grayscale digital images and then extracts luminance data from the grayscale digital images to use in generating colorization predictions via the image re-colorization neural network.

Furthermore, the image colorization system 102 includes an image re-colorization manager 808 to re-colorize portions of color digital images. For instance, the image re-colorization manager 808 utilizes a re-colorization neural network to generate re-colorization predictions for portions of color digital images based on local hints. Specifically, the image re-colorization manager 808 utilizes the image re-colorization neural network to determine specific objects/regions of digital images based on local hints and then re-colorize the indicated regions based on selected colors indicated by the local hints.

In one or more embodiments, the image colorization system 102 includes a neural network manager 810 to manage one or more neural networks in connection with editing digital images. In particular, as illustrated in FIG. 8, the neural network manager 810 manages a two-stage image colorization neural network 112 for colorizing or re-colorizing digital images. In some embodiments, the neural network manager 810 manages a plurality of instances of the two-stage image colorization neural network 112 to perform colorization and re-colorization of digital images. Also, the neural network manager 810 trains the two-stage image colorization neural network 112 by updating parameters of the two-stage image colorization neural network 112 based on losses and/or augmented digital images.

The image colorization system 102 also includes a data storage manager 814 (that comprises a non-transitory computer memory/one or more memory devices) that stores and maintains data associated with processing digital images. For example, the data storage manager 814 stores data associated with colorizing and re-colorizing digital images. To illustrate, the data storage manager 814 stores information associated with re-colorization neural networks, training datasets, image databases, neural network prediction outputs (e.g., pixel values for digital images, segmentation maps), and user input information (e.g., local hints).

Figure 9:
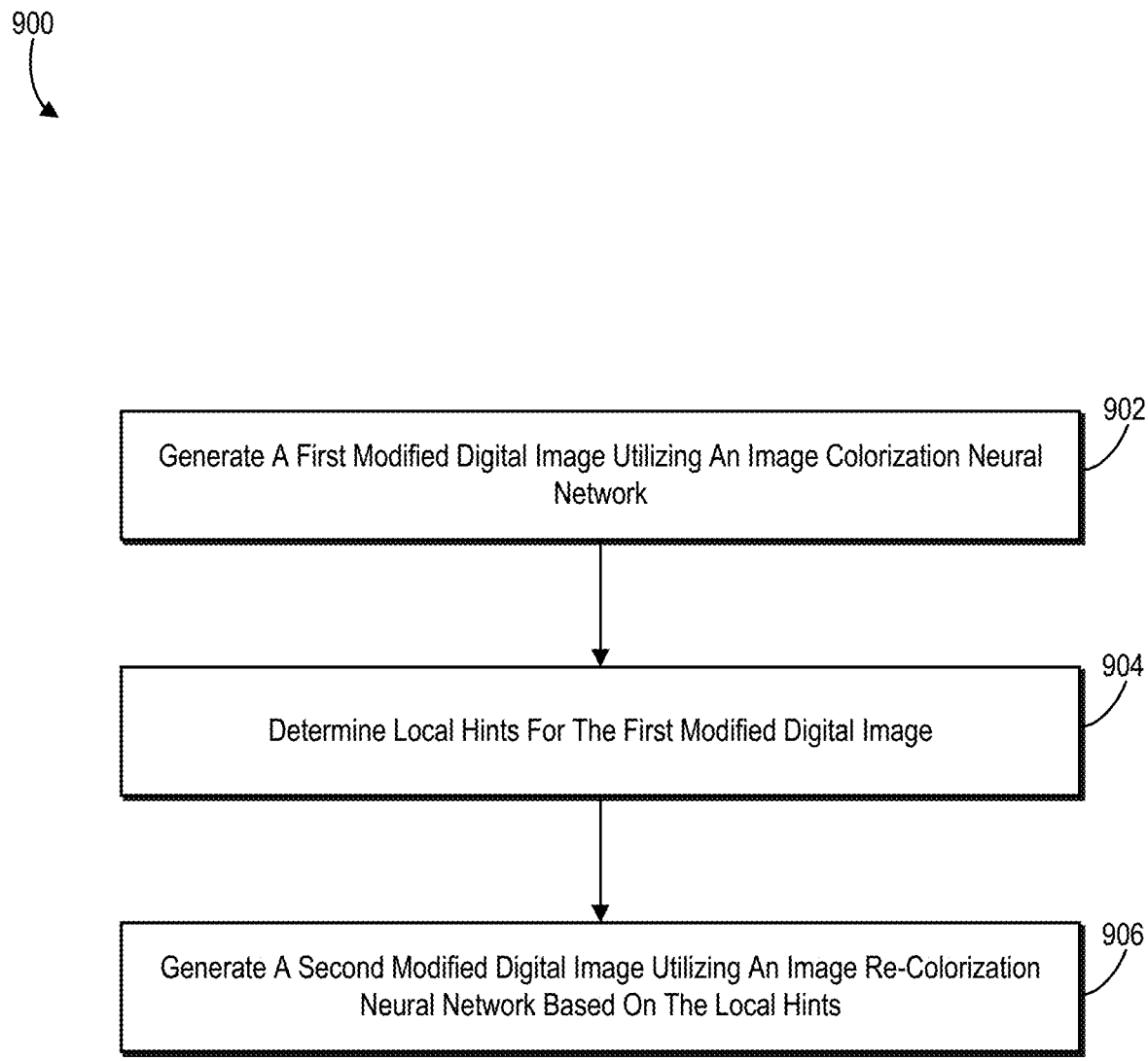
FIG. 9 illustrates a flowchart of a series of acts for utilizing a re-colorization neural network to generate a modified digital image based on local hints from user inputs in accordance with one or more implementations.

Turning now to FIG. 9, this figure shows a flowchart of a series of acts 900 of utilizing a two-stage image colorization neural network to generate a modified digital image based on local hints from user inputs. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of generating a first modified digital image utilizing an image colorization neural network. For example, act 902 involves generating, utilizing an image colorization neural network, a first modified digital image from the digital image by colorizing the digital image based on a luminance channel of the digital image. To illustrate, the digital image includes a grayscale digital image.

Act 902 can involve generating, utilizing the image colorization neural network, a plurality of predicted color values for a plurality of pixels in the digital image based on the luminance channel of the digital image. Act 902 can then involve modifying the plurality of pixels in the digital image based on the plurality of predicted color values. Furthermore, act 902, or an additional act, can involve providing the plurality of predicted color values to the image re-colorization neural network.

The series of acts 900 also includes an act 904 of determining local hints for the first modified digital image. For example, act 904 involves determining one or more selected locations within one or more regions of the first modified digital image based on one or more user inputs comprising one or more selected colors. Act 904 can involve receiving a first user input comprising a first selected color within a first region of the first modified digital image. Act 904 can then involve receiving a second user input comprising a second selected color within a second region of the first modified digital image, the first region being separated by at least one boundary from the second region. To illustrate, act 904 can involve receiving the one or more user inputs comprises receiving a first local hint corresponding to one or more pixels in a first region and a second local hint corresponding to one or more pixels in a second region.

Act 904 can involve determining a plurality of pixel locations of a plurality of separate graphical indicators within a plurality of different objects of the digital image. Act 904 can also involve determining a plurality of color values corresponding to the plurality of separate graphical indicators. For example, act 904 can involve determining that a local hint indicates a color value by presenting the color value for display within a graphical indicator at a client device.

In alternative embodiments, the series of acts 900 includes determining a luminance channel and color channels corresponding to a plurality of pixels of a color digital image. The series of acts 900 then includes receiving one or more user inputs comprising one or more color selections on one or more objects of the color digital image.

Additionally, the series of acts 900 includes an act 906 of generating a second modified digital image utilizing an image re-colorization neural network based on the local hints. For example, act 906 involves generating, utilizing the image re-colorization neural network, a second modified digital image from the first modified digital image by modifying one or more colors corresponding to the one or more regions of the first modified digital image according to the one or more selected colors. Act 906 can involve determining the one or more regions of the first modified digital image based on the one or more selected locations. Act 906 can then involve modifying one or more colors corresponding to the one or more regions of the first modified digital image according to the one or more selected colors.

Act 906 can involve modifying, utilizing the image re-colorization neural network, a first color corresponding to the first region based on the first selected color. Act 906 can also involve modifying, utilizing the image re-colorization neural network, a second color corresponding to the second region based on the second selected color.

Act 906 can also involve modifying colors of a plurality of different objects of the first modified digital image based on the plurality of color values corresponding to a plurality of separate graphical indicators according to a plurality of pixel locations of the plurality of separate graphical indicators.

The series of acts 900 can also include determining one or more unselected regions of the color digital image according to the one or more user inputs. For example, the series of acts 900 can include determining a third region separated by one or more boundaries from the first region and the second region. The series of acts 900 can then include maintaining a color of the third region from the first modified digital image to the second modified digital image.

According to one or more embodiments, the series of acts 900 can include determining one or more pixel regions of the color digital image in response to the one or more user inputs. The series of acts 900 can also include determining the one or more objects of the color digital image corresponding to the one or more pixel regions. Act 906 can then involve generating, from the one or more inputs, a binary mask indicating the one or more pixel regions of the color digital image. Act 906 can also involve generating the modified digital image based on the binary mask and the one or more color selections via the image re-colorization neural network.

In one or more embodiments, the series of acts 900 includes updating the image re-colorization neural network. For example, the series of acts 900 can include generating a colorized digital image comprising modified colors from a ground truth digital image comprising a plurality of regions or objects. The series of acts 900 can include determining one or more regions of the colorized digital image based on a plurality of sampled locations from the ground truth digital image. To illustrate, the series of acts 900 can include sampling a plurality of local hints at a plurality of locations from the ground truth digital image. The series of acts 900 can then include determining a first set of one or more regions of the colorized digital image comprising overlapping local hints and a second set of one or more regions of the colorized digital image without overlapping local hints.

Furthermore, the series of acts 900 can include generating a blended digital image based comprising a portion of the ground truth digital image and a portion of the colorized digital image according to the one or more regions based on the plurality of sampled locations. To illustrate, the series of acts 900 can include generating a blended digital image comprising first colors for the first set of one or more regions from the ground truth digital image and second colors for the second set of one or more regions from the modified digital image. The series of acts 900 can then include updating parameters of the image re-colorization neural network based on the blended digital image.

In additional embodiments, the series of acts 900 includes determining a local hints region loss based on a difference between the colorized digital image and a modified portion corresponding to a local hint indicating a selected location of the one or more selected locations. For example, the series of acts 900 can include determining a loss based on differences between the colorized digital image and the ground truth digital image according to a plurality of sampled local hints corresponding to locations of the ground truth digital image. More specifically, the series of acts 900 can include generating a mask for a local hint of the plurality of local hints based on a thresholded difference between the colorized digital image and a modified portion corresponding to the local hint. The series of acts 900 can then include determining a local hints region loss based on the modified portion corresponding to the local hint, a color value associated with the local hint, and the mask. The series of acts 900 can also include update the parameters of the image re-colorization neural network based further on the local hints region loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
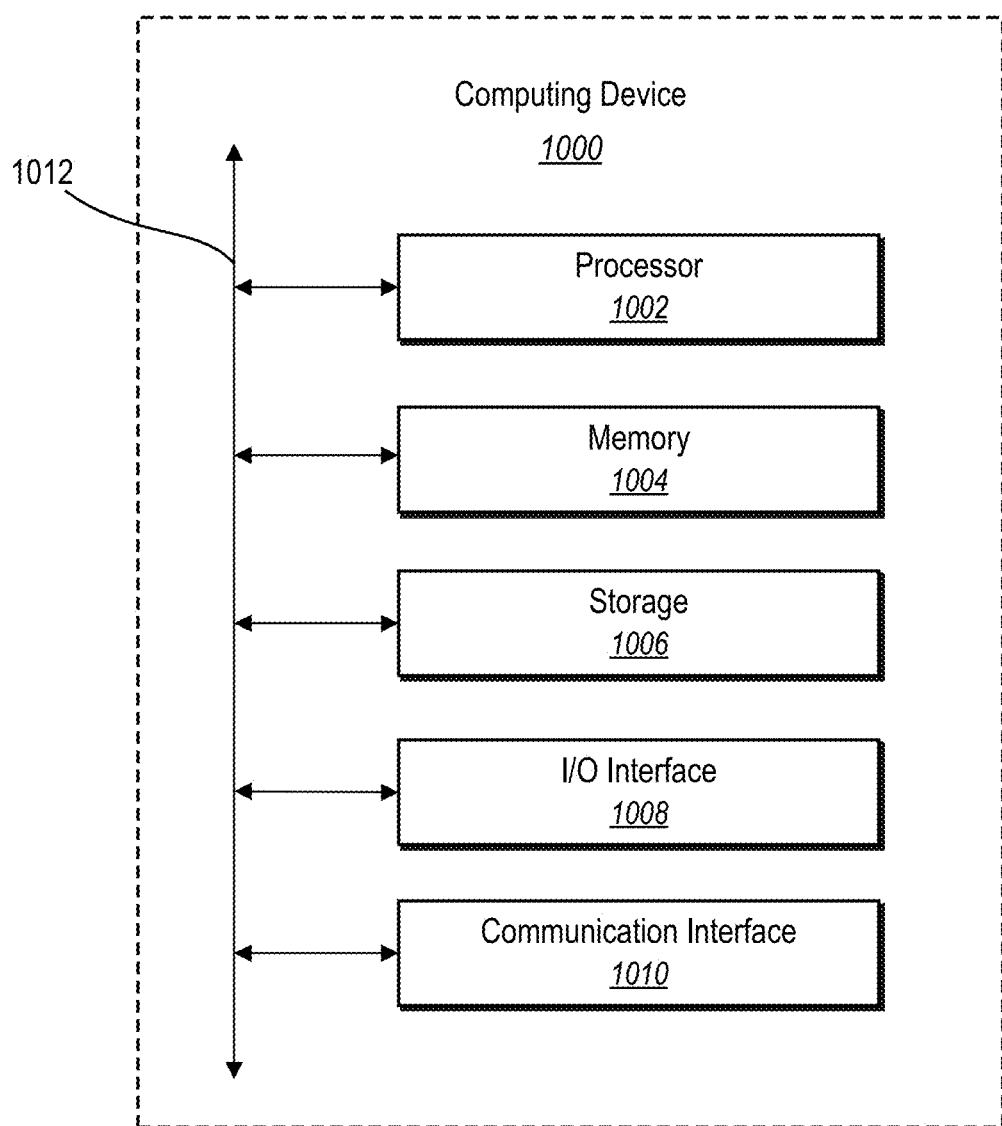
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   generate, utilizing an image colorization neural network, a first modified digital image comprising chrominance values from a digital image by generating a plurality of predicted pixel values colorizing a plurality of grayscale pixels in the digital image based on a luminance channel of the digital image, the first modified digital image being a colorized version of the digital image;
   receive, via a graphical user interface displaying the first modified digital image including the plurality of predicted pixel values colorizing the plurality of grayscale pixels of the digital image, one or more user inputs to one or more selected locations with predicted pixel values within one or more regions of the first modified digital image;
   determine, from the one or more user inputs for the one or more selected locations within the one or more regions of the first modified digital image, one or more local hints indicating one or more selected colors to modify color values of the one or more selected locations of the first modified digital image; and
   generate, a second modified digital image from the first modified digital image utilizing an image re-colorization neural network to process the one or more local hints, a luminance channel of the first modified digital image, and color channels of the first modified digital image by:
    determining the one or more regions of the first modified digital image based on the one or more selected locations; and
    modifying one or more colors corresponding to the one or more regions of the first modified digital image by changing predicted pixel values generated by the image colorization neural network in the color channels of the one or more regions according to the one or more selected colors indicated by the one or more local hints.

2. The non-transitory computer readable storage medium as recited in claim 1, further comprising instructions that, when executed by the at least one processor, cause the computing device to determine, in response to the one or more user inputs to the graphical user interface displaying the first modified digital image, the one or more selected locations within the one or more regions of the first modified digital image by:
    determining a plurality of pixel locations of a plurality of separate graphical indicators within a plurality of different objects of the digital image; and
    determining a plurality of color values corresponding to the plurality of separate graphical indicators.

3. The non-transitory computer readable storage medium as recited in claim 2, further comprising instructions that, when executed by the at least one processor, cause the computing device to generate the second modified digital image from the first modified digital image by modifying colors of the plurality of different objects of the digital image based on the plurality of color values corresponding to the plurality of separate graphical indicators according to the plurality of pixel locations of the plurality of separate graphical indicators.

4. The non-transitory computer readable storage medium as recited in claim 1, further comprising instructions that, when executed by the at least one processor, cause the computing device to:
    generate a colorized digital image based on a ground truth digital image comprising a plurality of regions;
    determine a loss based on differences between the colorized digital image and the ground truth digital image according to a plurality of sampled local hints corresponding to locations of the ground truth digital image; and
    update parameters of the image re-colorization neural network based on the loss.

5. A system comprising:
    one or more memory devices comprising a two-stage image colorization neural network, the two-stage image colorization neural network comprises an image colorization neural network and an image re-colorization neural network; and
    one or more processors configured to cause the system to:
    generate, utilizing the image colorization neural network, a first modified digital image from a digital image by colorizing the digital image based on a luminance channel of the digital image, the first modified digital image being a colorized version of the digital image;
    receive, via a graphical user interface displaying the first modified digital image including a plurality of predicted pixel values colorizing a plurality of grayscale pixels of the digital image, one or more user inputs to one or more selected locations with predicted pixel values within one or more regions of the first modified digital image;
    determine, from the one or more user inputs for the one or more selected locations within the one or more regions of the first modified digital image, one or more local hints indicating one or more selected colors to modify color values of the one or more selected locations of the first modified digital image; and
    generate a second modified digital image from the first modified digital image utilizing the image re-colorization neural network to process the one or more local hints, a luminance channel of the first modified digital image, and color channels of the first modified digital image by modifying one or more colors corresponding to the one or more regions of the first modified digital image by changing predicted pixel values generated by the image colorization neural network in the color channels of the one or more regions according to the one or more selected colors indicated by the one or more local hints.

6. The system as recited in claim 5, wherein the one or more processors are further configured to cause the system to generate the first modified digital image by:
    generating, utilizing the image colorization neural network, a plurality of predicted color values for the plurality of grayscale pixels in the digital image based on the luminance channel of the digital image;
    modifying the plurality of grayscale pixels in the digital image based on the plurality of predicted color values; and
    providing the plurality of predicted color values to the image re-colorization neural network.

7. The system as recited in claim 5, wherein the one or more processors are further configured to cause the system to receive the one or more user inputs comprising the one or more selected colors by:
    receiving, via the graphical user interface, a first user input comprising a first selected color within a first region of the first modified digital image; and
    receiving, via the graphical user interface, a second user input comprising a second selected color within a second region of the first modified digital image, the first region being separated by at least one boundary from the second region.

8. The system as recited in claim 7, wherein the one or more processors are further configured to cause the system to generate the second modified digital image by:
    modifying, utilizing the image re-colorization neural network, a first color corresponding to the first region based on the first selected color; and
    modifying, utilizing the image re-colorization neural network, a second color corresponding to the second region based on the second selected color.

9. The system as recited in claim 8, wherein the one or more processors are further configured to cause the system to generate the second modified digital image by:
    determining a third region separated by one or more boundaries from the first region and the second region; and
    maintaining a color of the third region from the first modified digital image to the second modified digital image.

10. The system as recited in claim 5, wherein the one or more processors are further configured to cause the system to update the image re-colorization neural network by:
    generating a colorized digital image comprising modified colors from a ground truth digital image;
    sampling a plurality of local hints from the ground truth digital image;

determining one or more regions of the colorized digital image based on pixel coordinates of the plurality of local hints relative to one or more segments of the plurality of local hints in a segmentation map of the ground truth digital image;

generating, from the ground truth digital image, a blend mask corresponding to the one or more regions of the colorized digital image;

generating a blend mask complement comprising opposite values from the blend mask;

generating, utilizing the blend mask and the blend mask complement, a blended digital image comprising a portion of the ground truth digital image and a portion of the colorized digital image according to the one or more regions; and updating parameters of the image re-colorization neural network based on the blended digital image.

11. The system as recited in claim 10, wherein the one or more processors are further configured to cause the system to:

determine a local hints region loss based on a difference between the colorized digital image and a modified portion corresponding to a local hint indicating a selected location of the one or more selected locations; and update the parameters of the image re-colorization neural network based further on the local hints region loss.

12. A computer-implemented method comprising:

generating, utilizing an image colorization neural network, a color digital image comprising chrominance values from a grayscale digital image by generating a plurality of predicted pixel values colorizing pixels of the grayscale digital image, the color digital image being a colorized version of the grayscale digital image;

determining, by at least one processor, a luminance channel and color channels corresponding to a plurality of pixels of the color digital image;

receiving, via a graphical user interface displaying the color digital image including the plurality of predicted pixel values colorizing the pixels of the grayscale digital image, one or more user inputs to one or more selected locations with predicted pixel values within one or more regions of the color digital image;

determining, from the one or more user inputs for the one or more selected locations within the one or more regions of the color digital image, one or more local hints indicating one or more selected colors to modify color values of the one or more selected locations of the color digital image; and generating, by the at least one processor utilizing an image re-colorization neural network, a modified digital image from the color digital image by processing the one or more local hints, the luminance channel, and the color channels by modifying one or more colors corresponding to the one or more regions of the color digital image by changing predicted pixel values generated by the image colorization neural network in the color channels of the one or more regions according to the one or more selected colors indicated by the one or more local hints.

13. The computer-implemented method as recited in claim 12, further comprising:

determining one or more pixel regions of the color digital image in response to the one or more user inputs to the color digital image via the graphical user interface; and determining one or more objects of the color digital image corresponding to the one or more pixel regions.

14. The computer-implemented method as recited in claim 13, wherein generating the modified digital image comprises:

generating, from the one or more user inputs, a binary mask indicating the one or more pixel regions of the color digital image; and generating the modified digital image based on the binary mask and the one or more local hints via the image re-colorization neural network.

15. The computer-implemented method as recited in claim 12, wherein generating the modified digital image comprises:

determining one or more unselected regions of the color digital image according to the one or more user inputs; and maintaining one or more colors in the one or more unselected regions based on the color channels.

16. The computer-implemented method as recited in claim 12, further comprising augmenting a dataset of digital images by:

generating a colorized digital image comprising modified digital colors from a ground truth digital image utilizing an additional re-colorization neural network;

sampling a plurality of local hints at a plurality of locations from the ground truth digital image;

determining a first set of one or more regions of the colorized digital image comprising overlapping local hints and a second set of one or more regions of the colorized digital image without overlapping local hints; and generating a blended digital image comprising first colors for the first set of one or more regions from the ground truth digital image and second colors for the second set of one or more regions from the modified digital image.

17. The computer-implemented method as recited in claim 16, further comprising:

generating a mask for a local hint of the plurality of local hints based on a thresholded difference between the colorized digital image and a modified portion corresponding to the local hint;

determining a local hints region loss based on the modified portion corresponding to the local hint, a color value associated with the local hint, and the mask; and updating parameters of the image re-colorization neural network based on the local hints region loss.

18. The computer-implemented method as recited in claim 12, further comprising generating, utilizing the image colorization neural network, the color digital image from the grayscale digital image based on a luminance channel of the grayscale digital image.

19. The computer-implemented method as recited in claim 18, wherein generating the modified digital image comprises:

determining the luminance channel of the color digital image based on the grayscale digital image; and determining the color channels based on a plurality of predicted color values for the grayscale digital image utilizing the image colorization neural network.

20. The computer-implemented method as recited in claim 12, wherein:

receiving, via the graphical user interface, the one or more user inputs comprises receiving a first local hint corresponding to one or more pixels in a first region and a second local hint corresponding to one or more pixels in a second region; and generating the modified digital image comprises modifying the first region based on a first color associated with the first local hint and the second region based on a second color associated with the second local hint.

\* \* \* \* \*